(12) United States Patent
Higashino

(10) Patent No.: US 7,666,543 B2
(45) Date of Patent: Feb. 23, 2010

(54) BATTERY

(75) Inventor: Tatsuya Higashino, Yamato (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/083,316

(22) Filed: Mar. 18, 2005

(65) Prior Publication Data

US 2005/0231158 A1 Oct. 20, 2005

(30) Foreign Application Priority Data

Mar. 31, 2004 (JP) ............................... 2004-107131

(51) Int. Cl.
*H01M 2/10* (2006.01)
*H01M 6/46* (2006.01)

(52) U.S. Cl. .................. 429/99; 429/152; 429/156; 429/130; 429/162

(58) Field of Classification Search ................ 320/150, 320/112; 429/71, 99, 120, 148, 156, 152, 429/162, 130, 149
See application file for complete search history.

(56) References Cited

U.S. PATENT DOCUMENTS

| | | | | |
|---|---|---|---|---|
| 5,879,831 | A * | 3/1999 | Ovshinsky et al. | 429/54 |
| 6,225,788 | B1 * | 5/2001 | Kouzu et al. | 320/150 |
| 6,455,186 | B1 * | 9/2002 | Moores et al. | 429/71 |
| 6,479,185 | B1 * | 11/2002 | Hilderbrand et al. | 429/148 |
| 6,576,365 | B1 * | 6/2003 | Meitav et al. | 429/130 |
| 6,818,343 | B1 * | 11/2004 | Kimoto et al. | 429/99 |
| 2001/0007728 | A1 * | 7/2001 | Ogata et al. | 429/120 |
| 2002/0028375 | A1 * | 3/2002 | Morishita et al. | 429/120 |
| 2003/0017384 | A1 * | 1/2003 | Marukawa et al. | 429/120 |
| 2004/0021442 | A1 * | 2/2004 | Higashino | 320/112 |
| 2004/0050414 | A1 * | 3/2004 | Oogami | 136/249 |
| 2004/0201366 | A1 * | 10/2004 | Kimoto et al. | 320/150 |
| 2005/0079407 | A1 * | 4/2005 | Higashino et al. | 429/66 |
| 2005/0089751 | A1 * | 4/2005 | Oogami et al. | 429/162 |
| 2005/0202311 | A1 * | 9/2005 | Higashino et al. | 429/99 |
| 2005/0231158 | A1 * | 10/2005 | Higashino | 320/112 |

FOREIGN PATENT DOCUMENTS

| | | |
|---|---|---|
| CN | 1328705 A | 12/2001 |
| EP | 0 834 952 A2 | 4/1998 |
| EP | 1 143 541 A1 | 10/2001 |
| JP | 10-106637 A | 4/1998 |
| JP | 2000-195480 A | 7/2000 |
| JP | 2001236937 * | 8/2001 |
| JP | 2003151520 * | 5/2003 |
| JP | 200431716 * | 1/2004 |

* cited by examiner

*Primary Examiner*—Edward Tso
*Assistant Examiner*—Alexis Boateng
(74) *Attorney, Agent, or Firm*—Foley & Lardner LLP

(57) ABSTRACT

A battery including unit-cell layers stacked on one another. Each of the unit-cell layers comprises: an array of unit cells; and a frame member which holds the array of unit cells therein. At least one of the frame members is formed to have an inlet for introducing a coolant into the inside of the battery and an outlet for discharging the coolant which has flown through the inside of the battery.

20 Claims, 23 Drawing Sheets

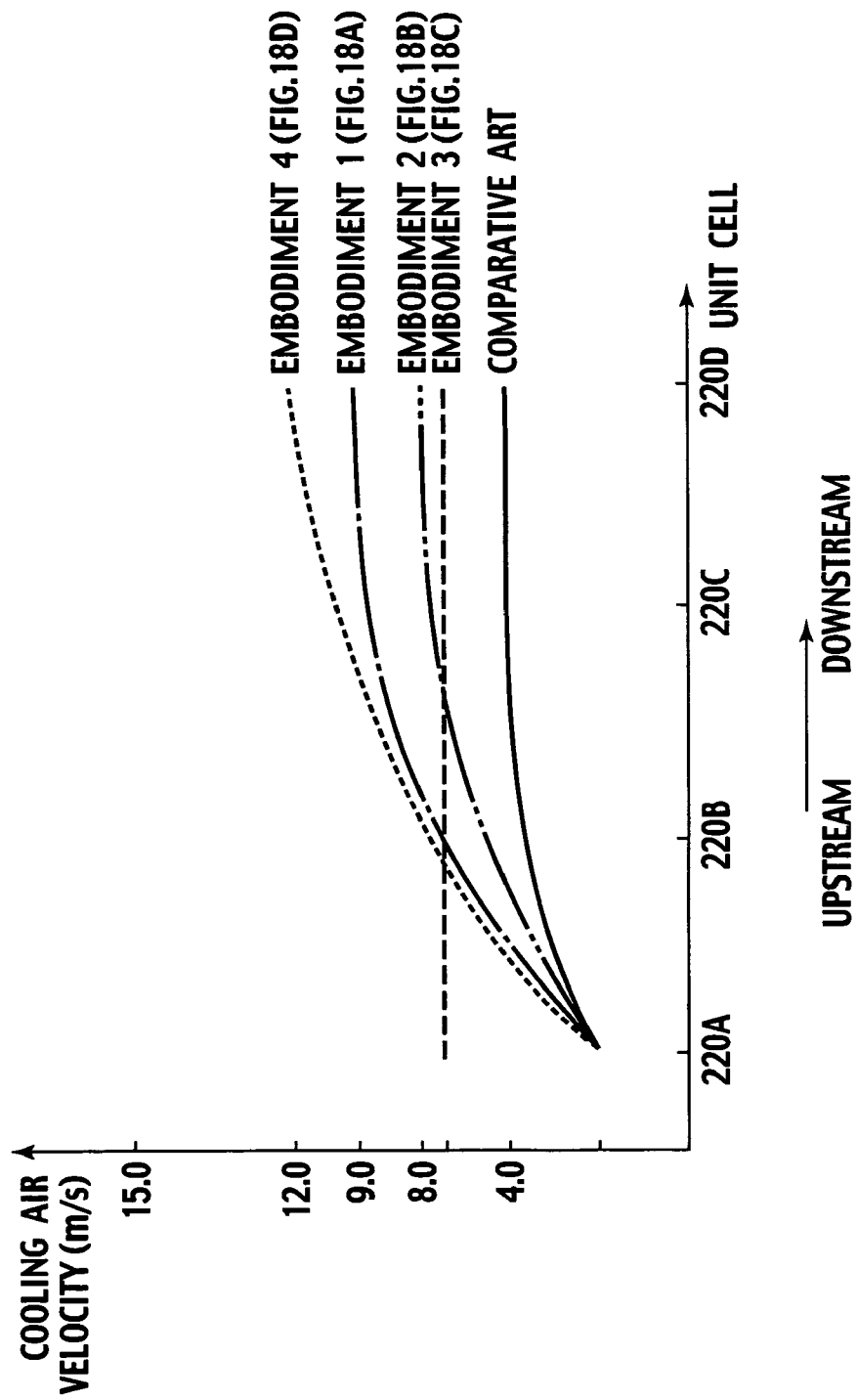

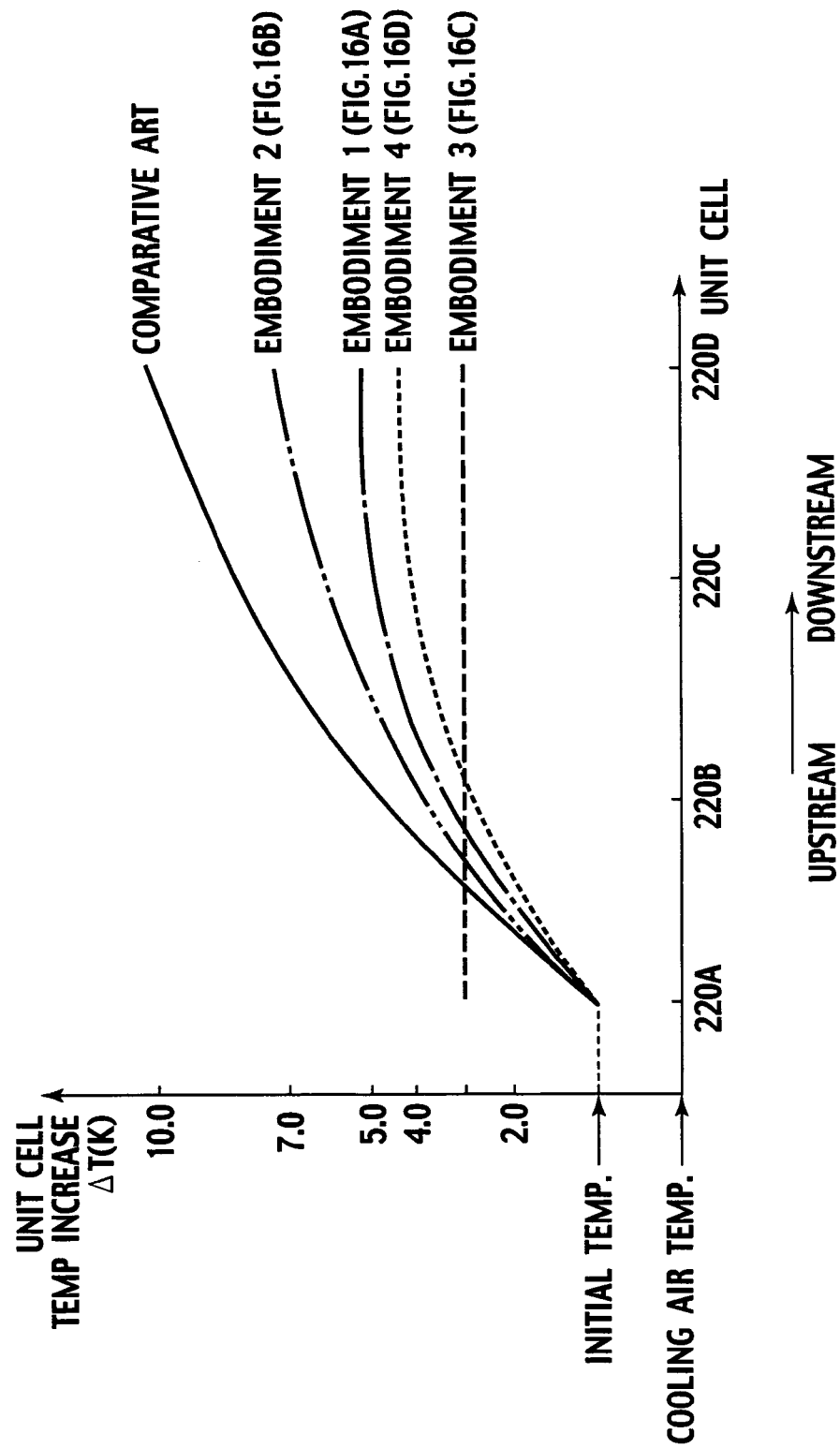

c-c b-b a-a

BATTERY

BACKGROUND OF THE INVENTION

1. Field of the Invention

The present invention relates to a battery, and more particularly, to a battery having a coolant passage for better cooling efficiency.

2. Description of Related Art

In recent years, growing environmental consciousness has led to a movement to shift the power sources of vehicles from engines using fossil fuels to motors using electrical energy.

The technologies of batteries and cells, which are the power sources of the motors, have also been developed and advanced rapidly.

A battery to be mounted on a hybrid vehicle is required to be compact and lightweight as well as capable of charging and discharging high power frequently. The battery is also required to have excellent shock-proofness and heat radiation characteristics.

A battery disclosed in the Japanese Patent Application Laid-open Publication No. 2000-195480 is one in which a plurality of flat cells are arranged in an outer frame member. Given spaces are provided between each cell by interposing spacers therebetween, so that each cell has good heat radiation characteristics, thus improving the cycle characteristics and the rate characteristics (discharge characteristics) of the battery.

The use of a flat unit cell in the above-mentioned battery makes energy density higher as compared with a battery composed of non-flat cells (for example, cells in a cylindrical or a rectangular shape), contributing to downsizing the battery. This means that the battery of flat unit cells will be suited for the battery mounted on vehicles because of its compactness and high energy density.

SUMMARY OF THE INVENTION

However, it is difficult for the above-mentioned battery to be further downsized and to have an increased energy density, since the battery requires the spaces between the unit cells thereof for keeping its radiation characteristic. The necessity of the spaces makes it difficult to keep the stiffness of the battery and improve the shock-proofness thereof. One solution for this problem would be flat unit cells stacked on one another in their thickness direction with heat sinks inserted between certain layers. However, the heat radiation of the battery in this configuration relies on the indirect heat transfer through the stacked unit cells to the heat sinks, resulting in an uneven three-dimensional temperature distribution in the battery. Particularly in a flat unit cell, an excessively uneven temperature distribution leads to decrease in lifetime of the cell.

The present invention has been made in the light of the problems and an object of the present invention is to provide a compact and lightweight high-energy density battery which is excellent in heat radiation and shock-proofness.

An aspect of the present invention is a battery comprising: unit-cell layers stacked on one another, each comprising: an array of unit cells; and a frame member which holds the array of unit cells therein, wherein at least one of the frame members is formed to have an inlet for introducing a coolant into the inside of the battery and an outlet for discharging the coolant which has flown through the inside of the battery.

In another embodiment of the present invention, there is battery wherein the second frame member also includes a separate inlet from that of the first frame member for introducing a coolant into the inside of the battery and a separate outlet from that of the second frame member for discharging the coolant which has flown through the inside of the battery. In another embodiment of the present invention, there is a battery comprising plurality of stacked unit-cell layers stacked on one another in a stacked direction, including a first unit-cell layer including at least a plurality of first unit cells and a first frame member which holds the first unit cells therein, wherein the first frame member includes an inlet for introducing a coolant into the inside of the battery and an outlet for discharging the coolant which has flown through the inside of the battery, and a second unit-cell layer adjacent the first unit-cell layer in the stack direction including at least a plurality of second unit cells and a second frame member which holds the second unit cells therein, wherein the first frame member and the second frame member are of a generally rectangular configuration from the perspective of the stack direction, and wherein the rectangular configuration is bifurcated by at least one cross member which are substantially parallel to two of the legs of the rectangular configuration and normal to the two other legs of the rectangular configuration and are respectively provided between individual cells of the plurality of the first unit cells and the second unit cells parallel to sides of individual unit cells.

In another embodiment of the present invention, the second frame member also includes a separate inlet from that of the first frame member for introducing a coolant into the inside of the battery and a separate outlet from that of the second frame member for discharging the coolant which has passed through the inside of the battery. In another embodiment of the present invention, there is a coolant passage between the inlet and the outlet that is adapted to enable a flow of the coolant therethrough to increase its velocity as the coolant flows from the inlet to the outlet. In another embodiment of the present invention, the cross members include respective notches, wherein the battery includes a coolant passage extending between the inlet and the outlet that also extends through the notches of the cross members, wherein the sizes of the inlet, the notches, and the outlet are progressively smaller in the direction of coolant flow, and wherein the inlet, the notches and the outlet are adapted to enable flow of the coolant therethrough to increase its velocity as the coolant flows from the inlet to the outlet. In another embodiment of the present invention, the plurality of first unit cells are held in contact, respectively, with the plurality of second unit cells in the stacked direction. Still further, in another embodiment of the present invention, the plurality of first unit cells and the plurality of second unit cells comprise flat unit cells.

BRIEF DESCRIPTION OF THE DRAWINGS

The invention will now be described with reference to the accompanying drawings wherein:

FIG. 19A is a graph showing the relationship between positions of unit cells in the battery and air flow velocity;

FIG. 19B is a graph showing the relationship between positions of the unit cells in the battery and temperature increase thereof;

DETAILED DESCRIPTION OF THE PREFERRED EMBODIMENT

Figure 1:
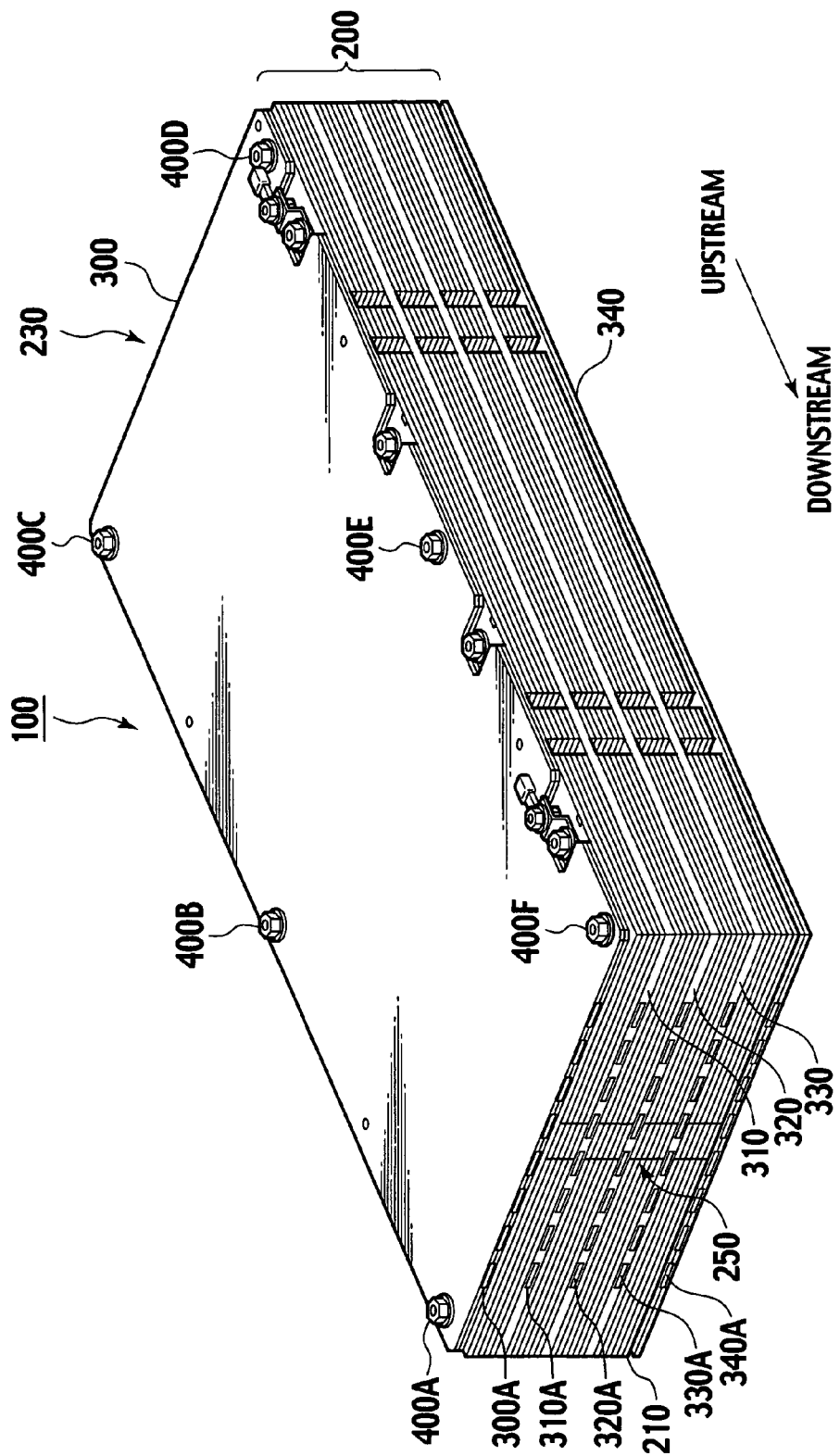
FIG. 1 is a perspective view showing the appearance of a battery related to the present invention.

Embodiments of the present invention will be explained below with reference to the drawings, wherein like members are designated by like reference characters.

The battery in each embodiment basically comprises a cell unit consisting of twenty-four (24) unit-cell layers and heat sinks pressing the cell unit from outside in the direction in which the unit-cell layers are stacked (i.e., in the thickness direction of the layer) to hold the cell unit. The cell unit also has intermediate heat sinks inserted every six unit-cell layers. Each of the unit-cell layers comprises a frame member and four flat unit cells (hereinafter referred to as unit cell) which are held with and housed in the frame member with those arrayed in the longitudinal direction of the battery.

The cell unit has ninety-six (96) unit cells in total. All unit cells are connected in series by electrical connecting means provided on the frame members and heat sinks.

First Embodiment

As shown in FIG. 1, a battery 100 related to this application is structured in such a manner that a cell unit 200 composed of a plurality of plate-shaped frame members 210 stacked in their thickness direction is put between heat sinks 300 and 340, and both end faces of the cell unit is pressed in the stacking direction to hold it integrally.

Each frame member 210 is formed to have thereon four holding sections, not shown, for holding four unit cells in parallel arrangement therein. The cell unit 200 has a stack of twenty-four frame members 210 and three intermediate heat sinks 310, 320, and 330 inserted every six layers of the frame members. The cell unit 200 thus has ninety-six (96) unit cells in total, with twenty-four unit cells in total between each two heat sinks.

Both sides of each frame member 210 (here, the side of the frame member refers to a side constituting the lateral side of the cell unit 200 when the unit-cell layers are stacked.) opposite to each other are formed to have a coolant inlet 230 for introducing air as a coolant into the cell unit 200 and a coolant outlet 250 for discharging the coolant circulated through the cell unit 200. In the cell unit 200, a coolant passage having the inlet 230 and the outlet 250 at both upstream and downstream ends thereof is defined by the inner surface of the frame member 210 and the outer surface of each unit cell housed in the frame member 210. That is, the air introduced from the inlet 230 circulates inside the unit through defined spaces between the frame members 210 and unit cells 200 and then discharged from the outlet 250.

The heat sinks 300 and 340 are fixed by fastening six pressing units connected thereto with nuts 400A to 400F. The pressing unit has a shaft attached to both ends of an extension coil spring with the nuts 400A and 400F. The provision of the pressing units between the heat sinks 300 and 340 gives all unit cells in the cell unit 200 a proper surface pressure in the stacking direction.

In the heat sinks 300 and 340 and the intermediate heat sinks 310, 320 and 330 are provided with a plurality of coolant passages 300A, 340A, 310A, 320A, and 330A therein through which the coolant flows from one lateral side to another lateral side thereof. (Here, the lateral side of the heat sink refers to a side constituting the lateral side of the cell unit 200 when the unit-cell layers are stacked.)

Figure 2:
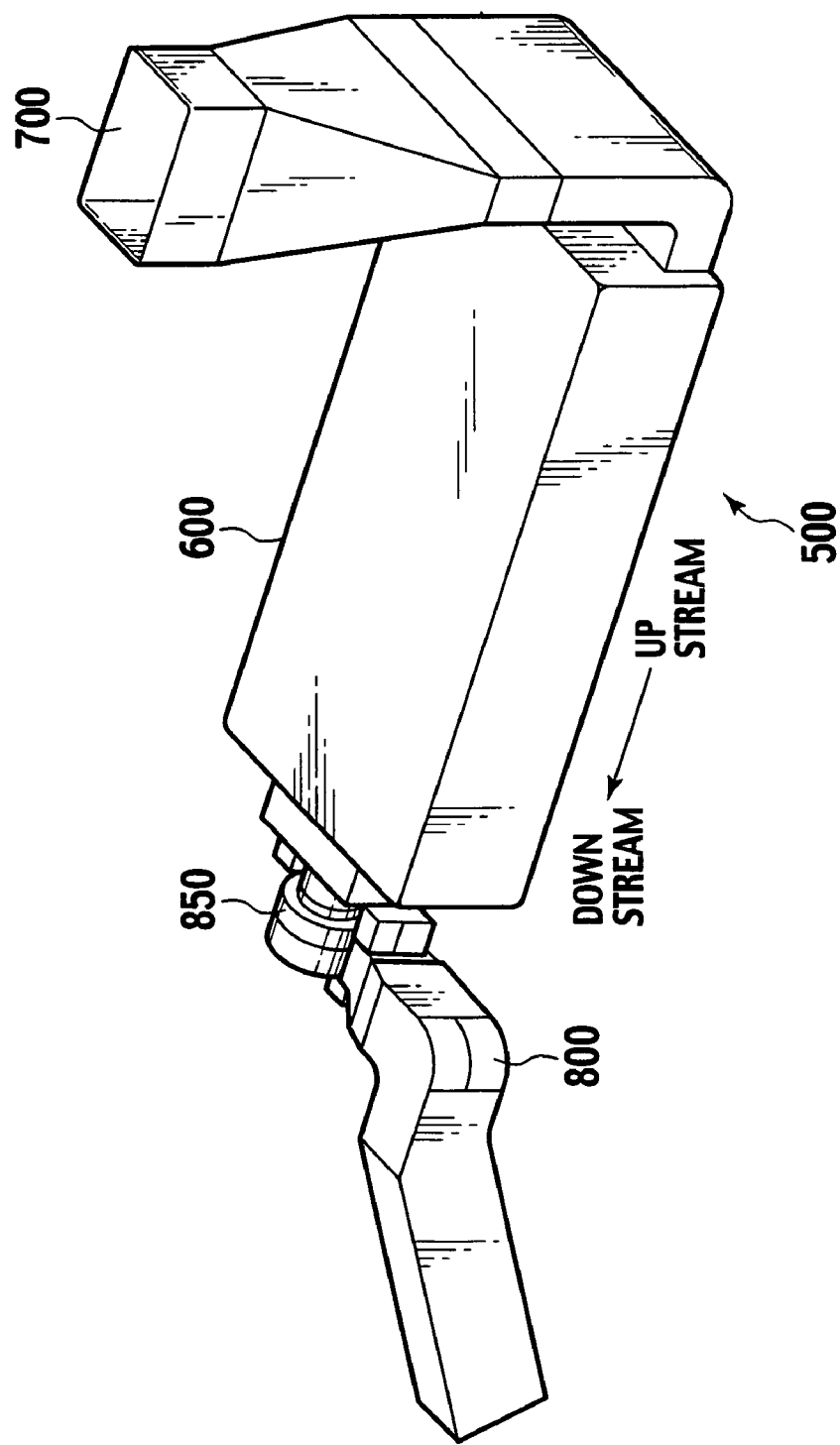
FIG. 2 shows the appearance of a cooling system for cooling the battery shown in FIG. 1.

The battery 100 is cooled with a vehicle-mounted cooling system 500, shown in FIG. 2, when mounted on a vehicle.

The cooling system 500 is equipped with a housing 600 for housing the battery 100, a coolant introducing duct 700 for introducing air into the housing 600, and a coolant discharging duct 800 for discharging air from the housing 600.

The battery 100 is set in the housing 600 so that the inlets 230 thereof are directed upstream and the outlets 250 thereof downstream. More specifically, the inlets 230 of the battery 100 are oriented toward the coolant introducing duct 700 and the outlets 250 of the battery 100 toward the coolant discharging duct 800. A single or a plurality of batteries 100 are arranged in the housing 600.

A ventilator fan 850 is provided on the coolant discharging duct 800 on the side of the housing 600. The ventilator fan 850 is equipped with a sensor for detecting temperature of air discharged from the housing 600. The rotating speed of the ventilator fan 850 (ventilation flow rate) is controlled by a controller (not shown) according to a temperature detected by the sensor.

In the battery 100 arranged in the housing 600, the air introduced from the inlet 230 is circulated through the coolant passage in the battery 100 and discharged from the outlet 250, cooling the unit cells in direct contact therewith. The air flowing through the coolant passages 300A, 340A, 310A, 320A and 330A of the heat sinks 300 and 340 and the intermediate heat sinks 310, 320, and 330 also cools the unit cells indirectly.

Figure 3:
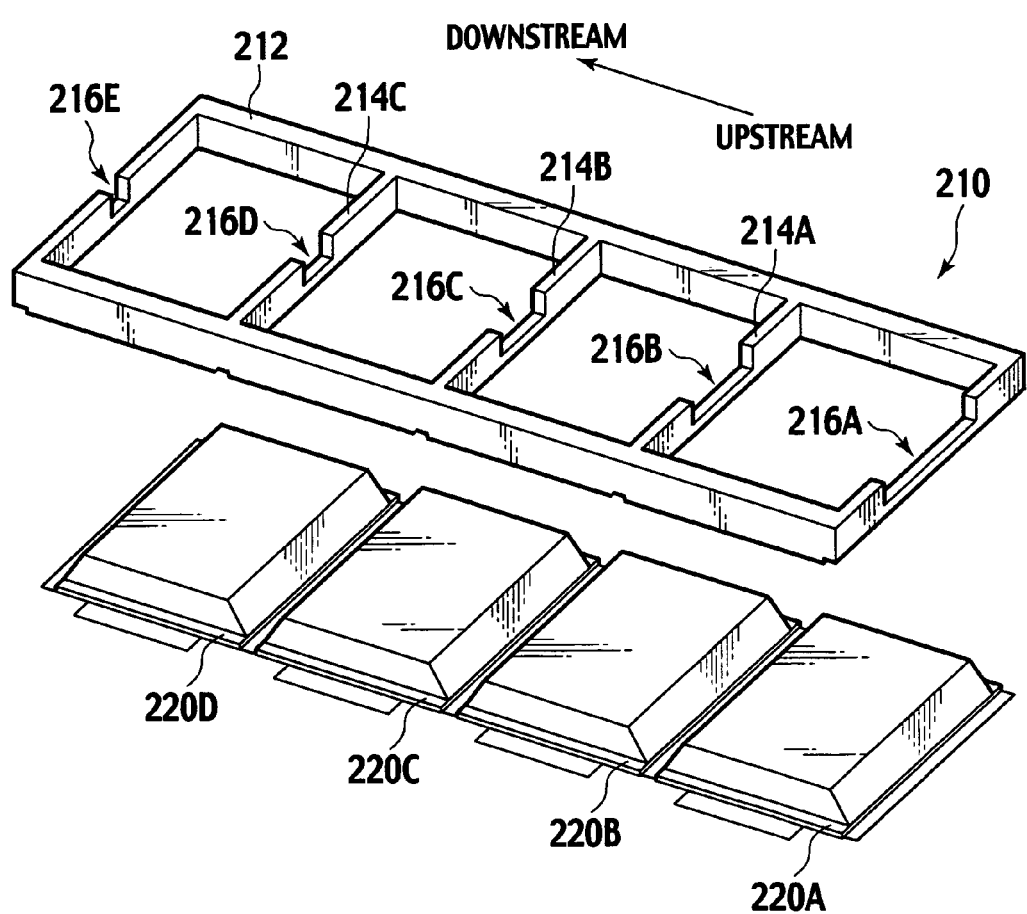
FIG. 3 shows the structure of a frame member in a first embodiment of the present invention.

As shown in FIG. 3, the frame member 210 is composed of a rectangular outer frame portion 212 and three cross member portions 214A, 214B, and 214C crossing over to two opposing sides of the outer frame portion 212 in the shape of a ladder. A U-shaped notch (opening or groove) 216A is formed on one side of the outer frame portion 212, a U-shaped notch 216B on the cross member portion 214A, a U-shaped notch 216C on the cross member portion 214B, a U-shaped notch 216D on the cross member portion 214C, and a U-shaped notch 216E on the other side of the outer frame portion 212. The frame member may be integrally formed, or, it may be formed by assembling two components symmetric with respect to a center line of the direction in which the unit cells are arranged.

Stacking and bringing the frame members 210 into intimate contact with one another causes the notch 216A to function as a coolant inlet and the notch 216E as a coolant outlet. The notches 216B, 216C and 216D function as a part of a coolant passage.

Both notches 216A and 216E are formed to be different in size from each other so that the cross-sectional area (an opening area) of the notch 216A functioning as the coolant inlet in the coolant flow direction is larger than that of the notch 216E functioning as the coolant outlet in the coolant flow direction.

The notches 216B, 216C and 216D functioning as a part of the coolant passage gradually decrease in cross-sectional area in the coolant flow direction from the upstream to downstream in the coolant flow direction so that the coolant flowing therethrough can be gradually increased in flow velocity from the upstream to downstream in the coolant flow direction. That is, the notch 216B is formed to be larger in cross-sectional area than the notch 216C, and the notch 216C also larger than the notch 216D; the notches 216B, 216C and 216D are different in cross-sectional area from one another. In this embodiment, all notches 216A to 216E are formed at center portions in the width direction of the frame member 210. The notch 216A is the largest in cross-sectional area than the others. The notches 216B, 216C, 216D, and 216E are so formed to be reduced in cross-sectional area in that order.

Figure 4:
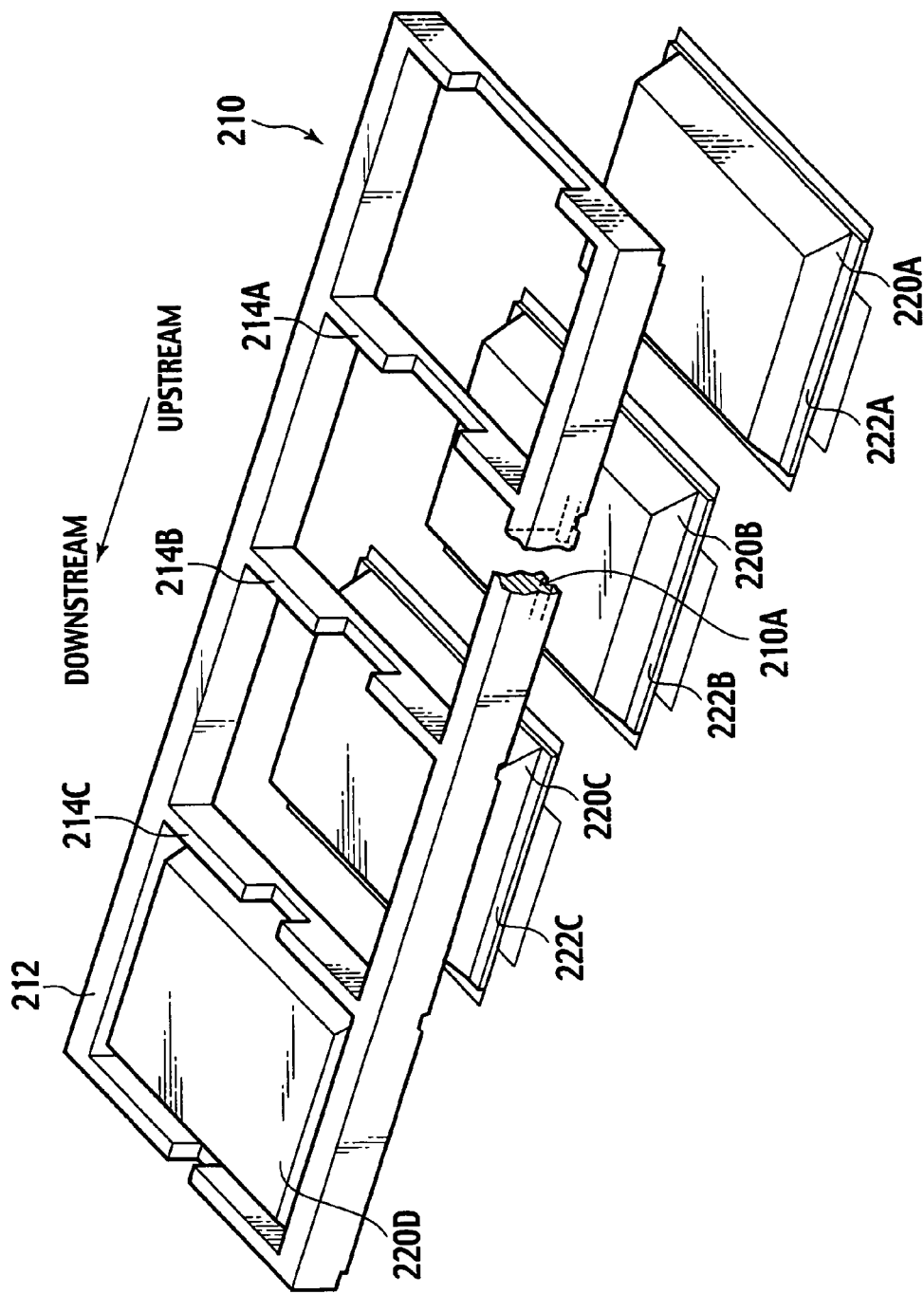
FIG. 4 shows the structure of the frame member in the first embodiment.

Unit cells 220A, 220B, 220C and 220D are lithium-ion cells each having a power generating element covered with a laminate film, and the power-generating portion is formed in a stool shape having a trapezoidal cross section as shown in the figure. The unit cells 220A, 220B, 220C and 220D are so arranged that their stool-shaped portions are inserted upward from under the frame member into compartment spaces defined by the outer frame portion 212 and the cross member portions 214A, 214B and 214C of the frame member 210 as shown in FIG. 4. Thereby the unit cells 220A, 220B, 220C and 220D are held flat with the outer frame portion 212 and the cross member portions 214A, 214B and 214C of the frame member 210 respectively.

The frame member 210 is formed to be slightly thicker than the unit cells 220 so that all unit cells 220 can be subjected to a predetermined surface pressure and all frame members 210 can be compressed with some deformation.

In the above description, a part of the coolant passage is formed by the notches 216B, 216C, and 216D. In addition, a groove 210A is formed in the outer frame portion 212 and the cross member portions 214A, 214B and 214C of the frame member 210 so as to circulate air on the surface thereof where the peripheral flange portions 222A, 222B, 222C and 222D of the unit cells 220A, 220B, 220C and 220D come into contact therewith, as shown in FIG. 4. The circulation of air through the groove will remove heat of the unit cells 220A, 220B, 220C and 220D through the peripheral flange portions 222A, 222B, 222C and 222D.

Figure 5:
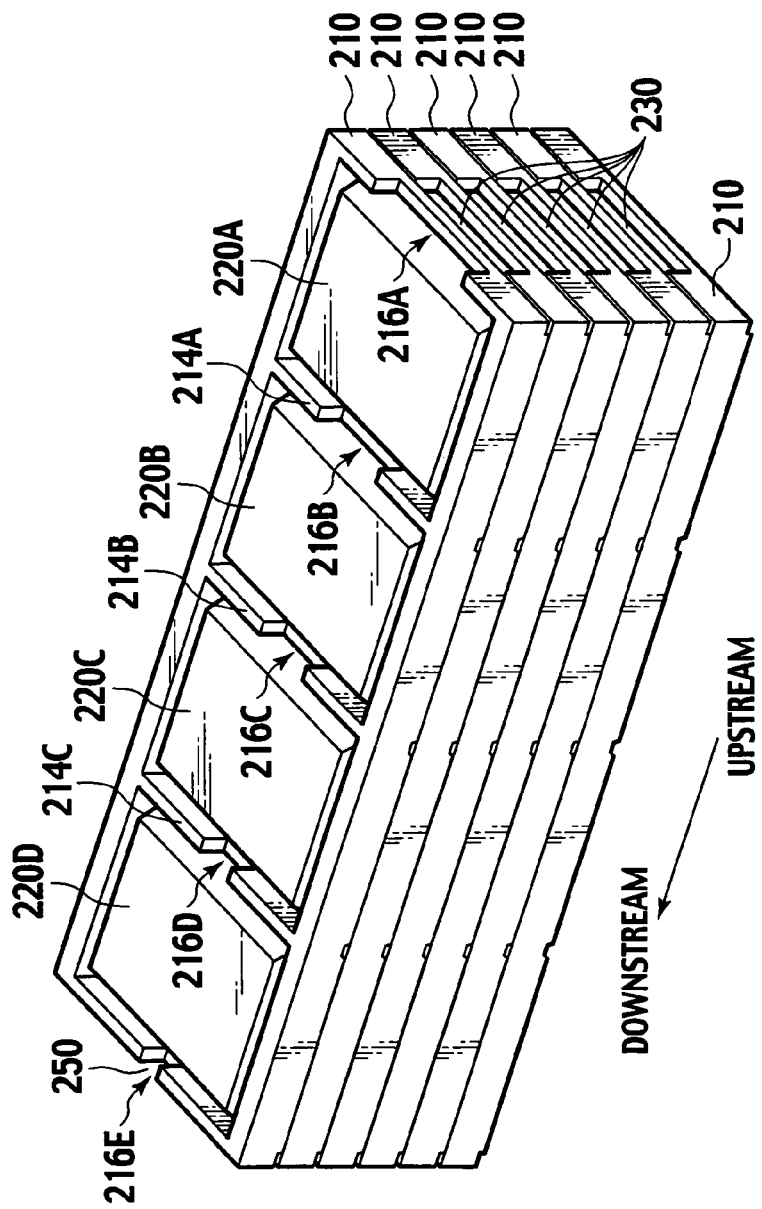
FIG. 5 shows the structure of the frame member in the first embodiment.
Figure 6:
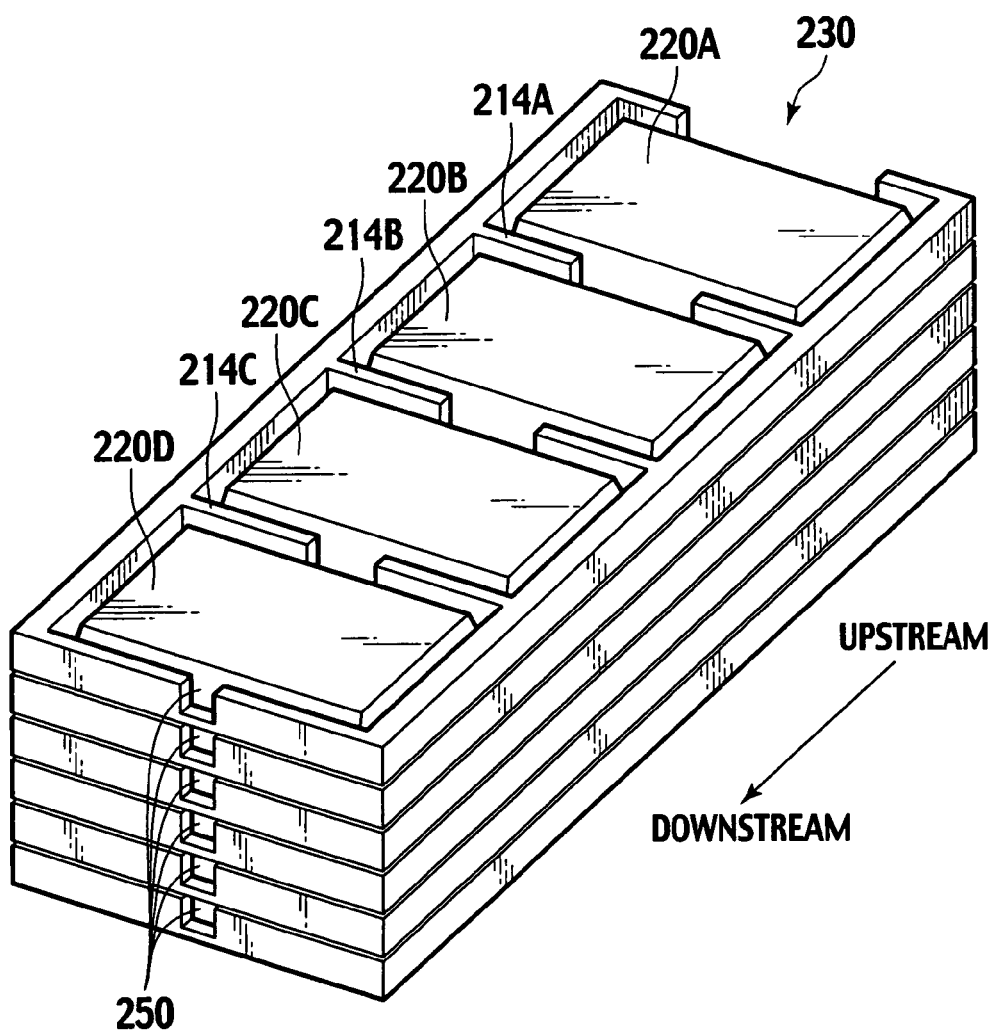
FIG. 6 shows the structure of the frame member in the first embodiment.
Figure 8:
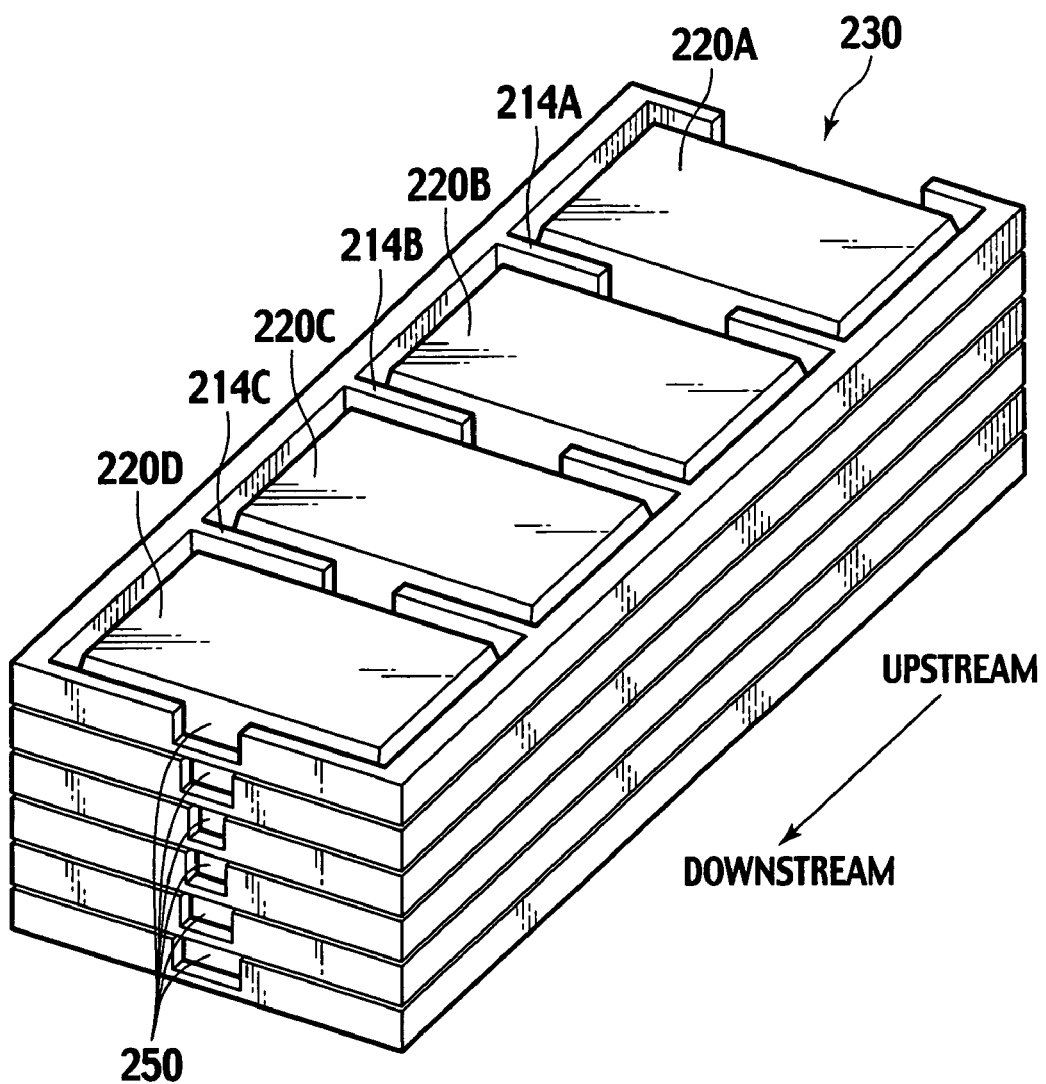
FIG. 8 shows the structure of the frame member of FIG. 7.

Six frame members 210, each holding the unit cells 220A, 220B, 220C and 220D in the abovementioned manner, are stacked on one another as illustrated in FIGS. 5 and 8. This stack arrangement brings the unit cells into direct contact or coherence with each other, and the frame members into direct contact with each other in the stacking direction. A coolant passage from the inlet 230 to outlet 250 is formed by interstices or spaces defined between the frame members 210 and the unit cells 220, the grooves 210A formed in the frame member 210, and the notches 216B to 216D.

The stack so built in the above manner is further stacked while inserting the intermediate heat sinks 310, 320, and 330 therebetween as shown in FIG. 1. The stack is placed between the heat sinks 300 and 340 and fastened with the nuts 400A to 400F to form the battery. The operation of the ventilator fan 850 of the cooling system 500 with the battery 100 is set in will produce the following air flow within the frame members 210 of the battery 100.

Cohesion or close contact of the frame members 210 with one another in the stacking direction permits air to be introduced only from the inlet 230 shown in FIGS. 5 and 8. The introduced air reaches the notch 216B of the cross member portion 214A through the interstices between the outer surface of the unit cell 220A and the inner surface of the frame member 210, and through the groove 210A of the frame member 210 formed in a position where the frame member comes into contact with the peripheral flange portion of the unit cell 220A. The air introduced from the notch 216B then reaches the notch 216C of the cross member portion 214B through the interstices between the outer surface of the unit cell 220B and the inner surface of the frame member 210, and through the groove 210A of the frame member 210 formed in a position where the frame member comes into contact with the peripheral flange portion of the unit cell 220B. The air introduced from the notch 216C then reaches the notch 216D of the cross member portion 214C through the interstices between the outer surface of the unit cell 220C and the inner surface of the frame member 210, and through the groove 210A of the frame member 210 formed in a position where the frame member comes into contact with the peripheral flange portion of the unit cell 220C. Finally the air introduced from the notch 216D is discharged from the outlet 250 through the interstices between the outer surface of the unit cell 220D and the inner surface of the frame member 210 and the groove 210A of the frame member 210 formed in a position where the member comes into contact with the peripheral flange portion of the unit cell 220C. In this manner the unit cells 220A to 220D are directly cooled by the air flowing on the outer surfaces thereof and the peripheral flange portions thereof.

The notch 216A forming the inlet 230, the notches 216B to 216D forming the coolant passage, and the notch 216E forming the outlet 250 are formed to be gradually reduced in cross-sectional area from the inlet 230 to the outlet 250, while the air velocity gradually increases as air flows from the inlet 230 to the outlet 250. This allows the air introduced from the inlet 230 to flow through spaces defined between the inner surface of the frame member 210 and the outer surface of each unit cell 220, to converge at the center portion of each cross member portion to increase its velocity toward the downstream, and to be discharged from the outlet 250. Although the air introduced from the inlet 230 gradually increases in temperature as the air flows downstream, the air gradually increases in flow velocity toward the outlet 250. This makes a cooling efficiency even at the upstream and at the downstream, equally cooling all unit cells 220A to 220D wherever they are. The frame member 210 may be formed so that the interstices forming a part of the coolant passage between the unit cells 220A, 220B, 220C and 220D and the frame member 210 are gradually decreased in width or size of flow passage toward the downstream from the upstream.

Figure 7:
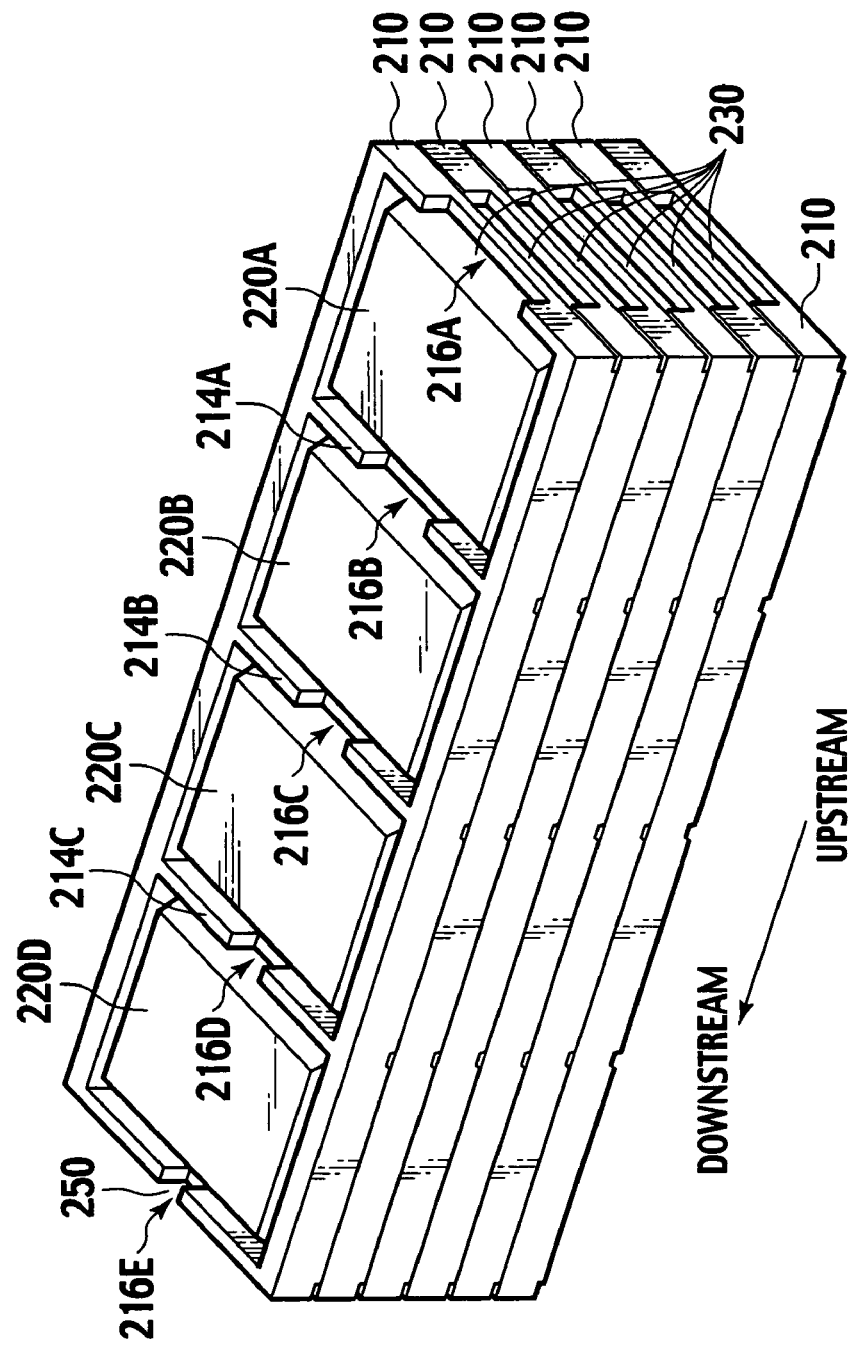
FIG. 7 shows the structure of another example of a frame member in the first embodiment.

As shown in another example of the first embodiment in FIGS. 7 and 8, the inlet 230 and outlet 250 may be differentiated in cross-sectional area in the stacking direction of the frame member 210 according to a stack level (upward and downward position) thereof, in view of a cooling efficiency at unit cells 220 which are far from the heat sinks 300 and 340 or the intermediate heat sinks 310, 320 and 330. In the present embodiment, the inlet 230 gradually increases in cross-sectional area from the one end of stack (bottom side) of the frame member 210 to the intermediate position, and gradually decreases in cross-sectional area from the intermediate position to the other end of the stack (upper side). On the other hand, the outlet 250 gradually decreases in cross-sectional area from one end of stack (bottom side) of the frame member 210 to the intermediate position, and gradually increases in cross-sectional area from the intermediate position to the other end of the stack (upper side). This achieves a uniform three-dimensional distribution in temperature all over the unit cells 100, since the unit cells 220 at a position far from the heat sinks (where heat of the cells is not easily removed thereby) can have an increased air flow rate with an increased air flow velocity as compared with those near the heat sinks (at a position where heat of the cells is easily removed thereby).

In the present embodiment, air as a coolant is exemplified, but it is not limited to this. Inactive gas such as nitrogen and liquid such as oil may be used according to the required cooling capacity.

Second Embodiment

Figure 9:
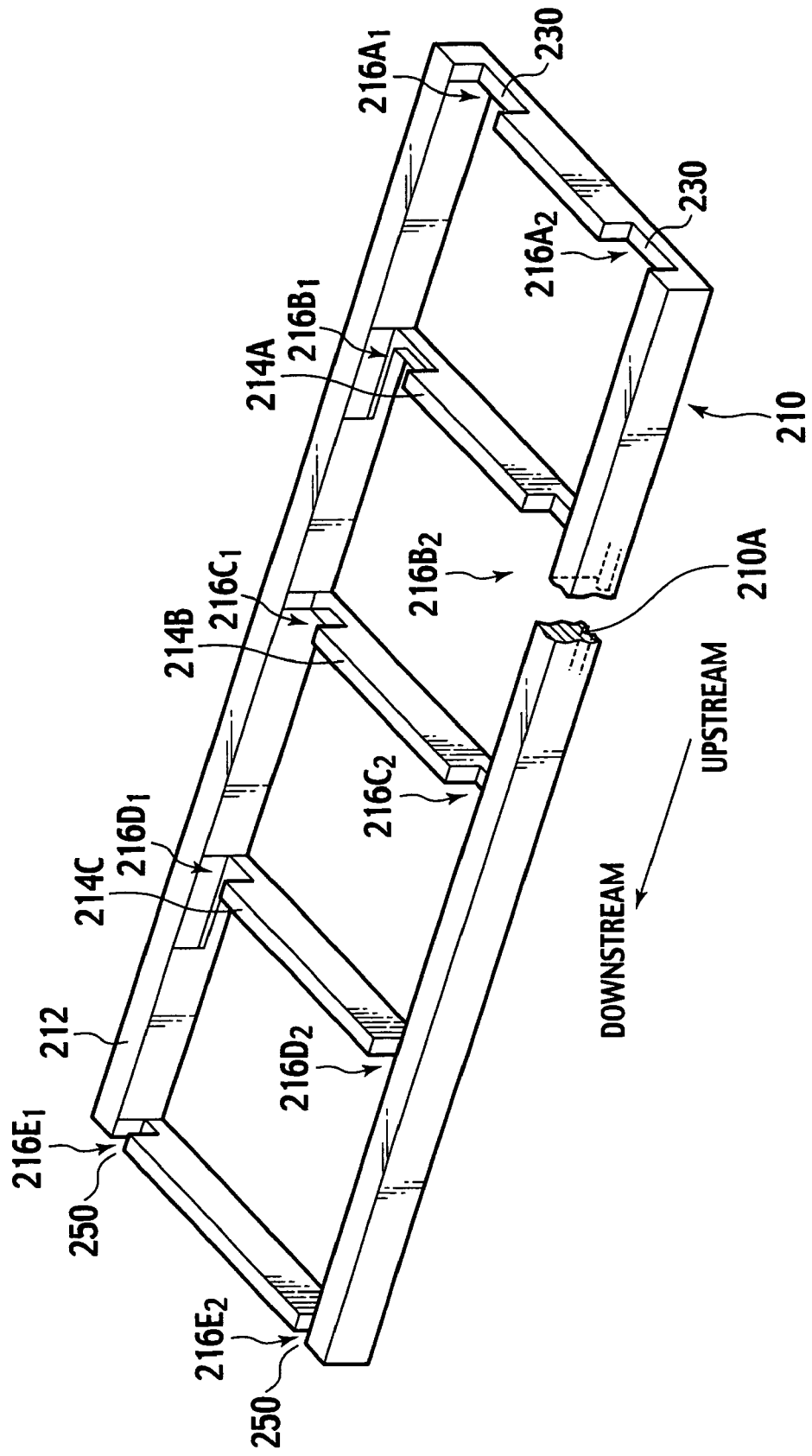
FIG. 9 shows the structure of a frame member in a second embodiment of the present invention.
Figure 10:
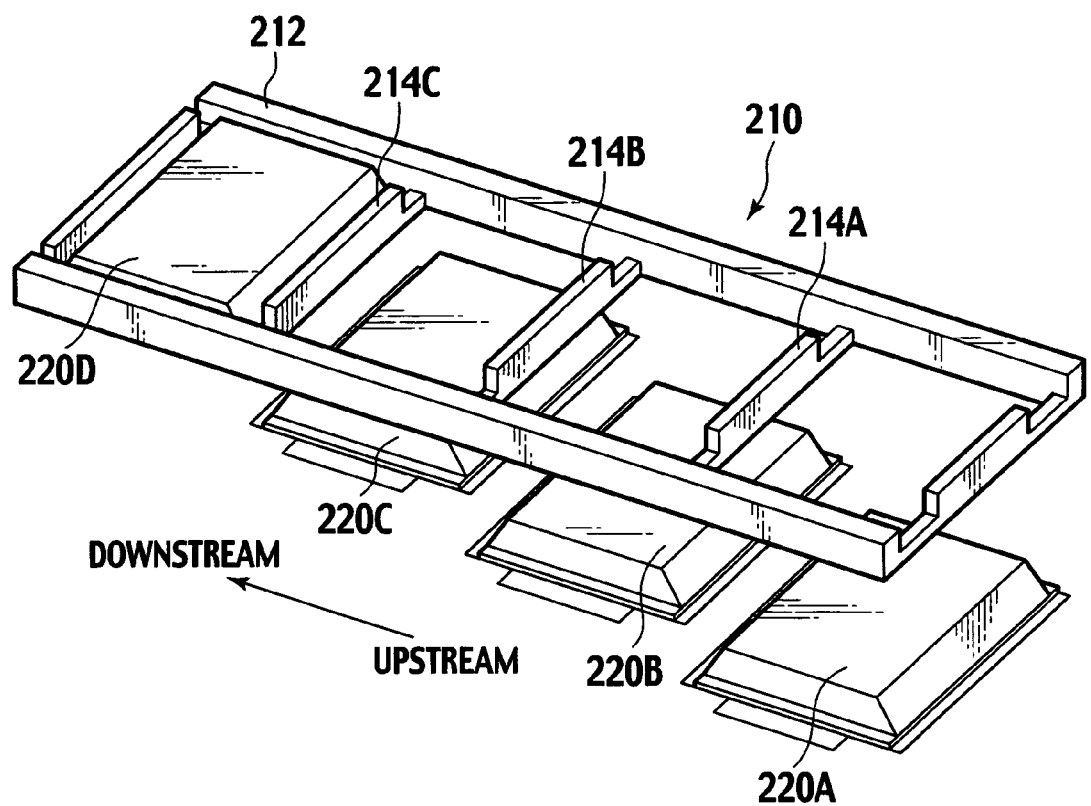
FIG. 10 shows the structure of the frame member in the second embodiment.
Figure 11:
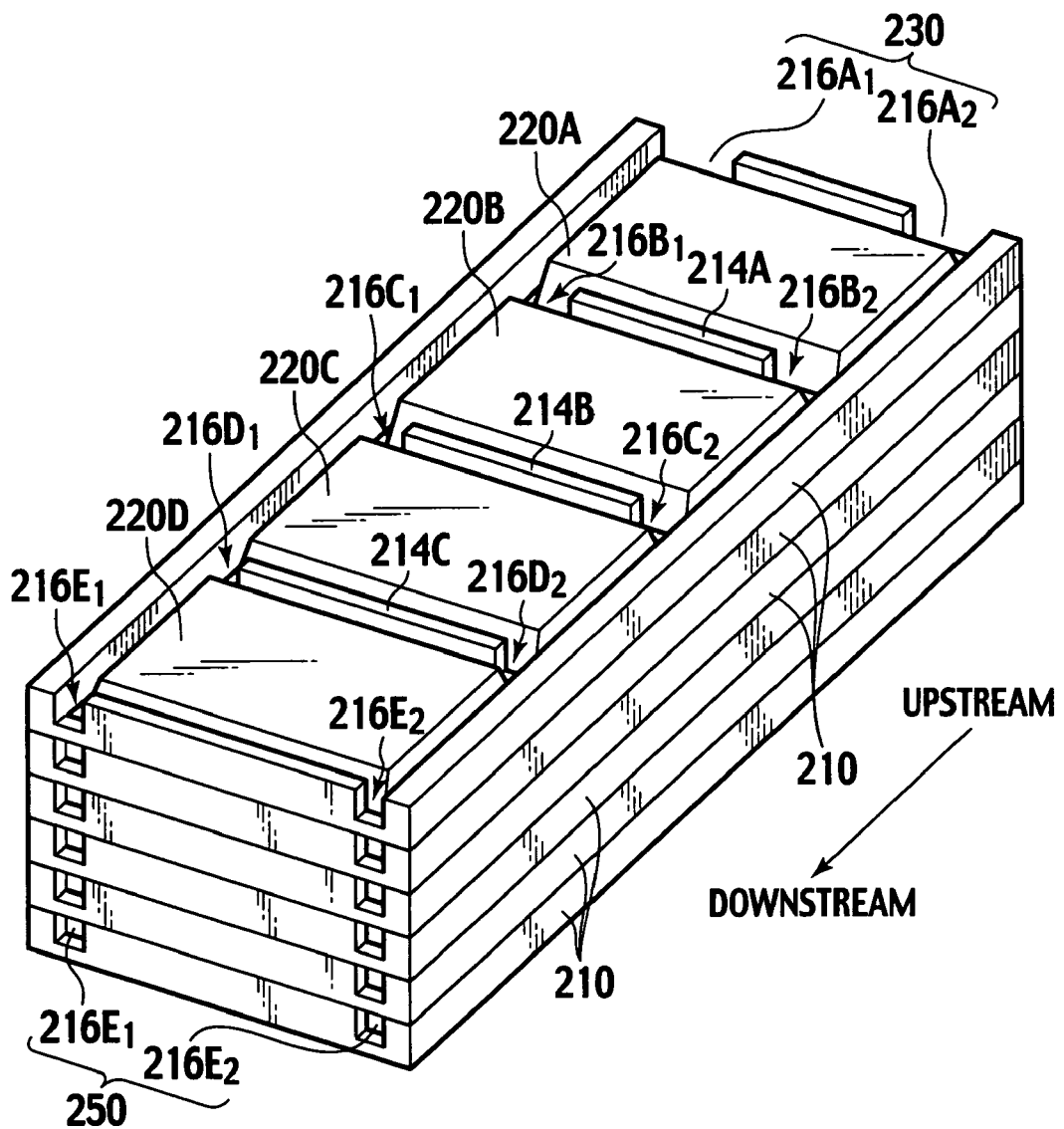
FIG. 11 shows the structure of the frame member in the second embodiment.

The configuration of the frame member related to the second embodiment is described according to FIGS. 9 to 11.

Similarly to the first embodiment, the frame member 210 is composed of a rectangular outer frame portion 212 and three cross member portions 214A, 214B, and 214C crossing over to two opposing sides of the outer frame portion 212 in the shape of a ladder. U-shaped notches (openings or grooves) 216A1 and 216A2 are formed on one side of the outer frame portion 212 at both ends thereof, U-shaped notches 216B1 and 216B2 on the cross member portion 214A at both ends thereof, U-shaped notches 216C1 and 216C2 on the cross member portion 214B at both ends thereof, U-shaped notches 216D1 and 216D2 on the cross member portion 214C at both ends thereof, and U-shaped notches 216E1 and 216E2 on the other side of the outer frame portion 212 at both ends thereof. Further, there is formed in the frame member 210 a groove 210A similar to that of the first embodiment.

Stacking and bringing the frame members 210 into intimate contact with one another causes the notches 216A1 and 216A2 to function as coolant inlets 230 and the notches 216E1 and 216E2 as coolant outlets 250. Each of the notches 216B1, 216B2, 216C1, 216C2, 216D1 and 216D2 functions as a part of a coolant passage.

The notches 216A1 and 216A2 functioning as the inlet 230 in the coolant circulation direction are the same in cross-sectional area, the notches 216B1 and 216B2, 216C1 and 216C2, 216D1 and 216D2 composing the coolant passage are also the same in cross-sectional area respectively, and the notches 216E1 and 216E2 functioning as the outlet 250 are the same in cross-sectional area as well.

In the present embodiment as with the first embodiment the notch 216A1 and 216A2 are the largest in cross section than the others at the both ends of the frame member 210 in the longitudinal direction. The notches 216B1 and 216B2, 216C1 and 216C2, 216D1 and 216D2, and 216E1 and 216E2 are formed to be gradually reduced in cross section in that order.

The unit cells 220A, 220B, 220C and 220D are so arranged that their stool-shaped portions are inserted upward from under the frame member into compartment spaces defined by the outer frame portion 212 and the cross member portions 214A, 214B and 214C of the frame member 210 as shown in FIG. 10.

Six frame members 210, each holding the unit cells 220A, 220B, 220C and 220D in the abovementioned manner, are stacked on one another as illustrated in FIG. 11. This stack arrangement brings the unit cells into direct contact or coherence with each other, and the frame members into direct contact with each other in the stacking direction. A coolant passage from the inlet 230 to outlet 250 is formed by interstices or spaces defined between the frame members 210 and the unit cells 220, the grooves 210A formed in the frame member 210, and the notches 216B1 to 216D2.

The stack so built in the above manner is further stacked while inserting the intermediate heat sinks 310, 320, and 330 therebetween as shown in FIG. 1. The stack is placed between the heat sinks 300 and 340 and fastened with the nuts 400A to 400F to form the battery. The operation of the ventilator fan 850 of the cooling system 500 with the battery 100 is set in will produce the following air flow within the frame members 210 of the battery 100.

Cohesion or close contact of the frame members 210 with one another in the stacking direction permits air to be introduced only from the inlets 230 shown in FIG. 11. The introduced air reaches the notches 216B1 and 216B2 of the cross member portion 214A through the interstices between the outer surface of the unit cell 220A and the inner surface of the frame member 210, and through the groove 210A of the frame member 210 formed in a position where the frame member comes into contact with the peripheral flange portion of the unit cell 220A. The air introduced from the notches 216B1 and 216B2 then reaches the notches 216C1 and 216C2 of the cross member portion 214B through the interstices between the outer surface of the unit cell 220B and the inner surface of the frame member 210, and through the groove 210A of the frame member 210 formed in a position where the frame member comes into contact with the peripheral flange portion of the unit cell 220B. The air introduced from the notches 216C1 and 216C2 then reaches the notches 216D1 an 216D2 of the cross member portion 214C through the interstices between the outer surface of the unit cell 220C and the inner surface of the frame member 210, and through the groove 210A of the frame member 210 formed in a position where the frame member comes into contact with the peripheral flange portion of the unit cell 220C. Finally the air introduced from the notches 216D1 an 216D2 is discharged from the outlet 250 through the interstices between the outer surface of the unit cell 220D and the inner surface of the frame member 210 and the groove 210A of the frame member 210 formed in a position where the member comes into contact with the peripheral flange portion of the unit cell 220C. In this manner the unit cells 220A to 220D are directly cooled by the air flowing on the outer surfaces thereof and the peripheral flange portions thereof.

The notches 216A1 and 216A2 forming the inlet 230, the notches 216B1 to 216D2 each forming a part of the coolant passage, and the notches 216E1 and 216E2 forming the outlet 250 are formed to be gradually reduced in cross-sectional area from the inlet 230 to the outlet 250, while the air velocity gradually increases as air flows from the inlet 230 to the outlet 250. This allows the air introduced from the inlet 230 to flow through spaces defined between the inner surface of the frame member 210 and the outer surface of each unit cell 220, to increase its velocity when passing the cross member portions 214 toward the downstream, and to be discharged from the outlet 250. Although the air introduced from the inlet 230 gradually increases in temperature as the air flows downstream, the air gradually increases in flow velocity toward the outlet 250. This makes a cooling efficiency even at the upstream and at the downstream, equally cooling all unit cells 220A to 220D wherever they are.

Third Embodiment

Figure 12:
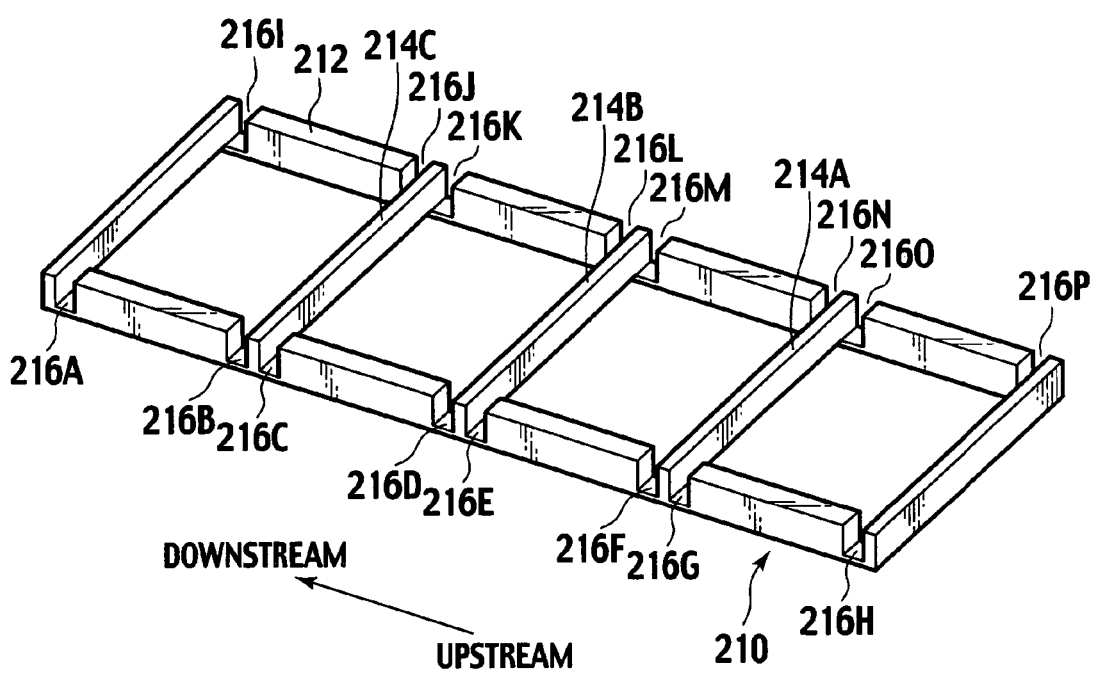
FIG. 12 shows the structure of a frame member in a third embodiment of the present invention.
Figure 13:
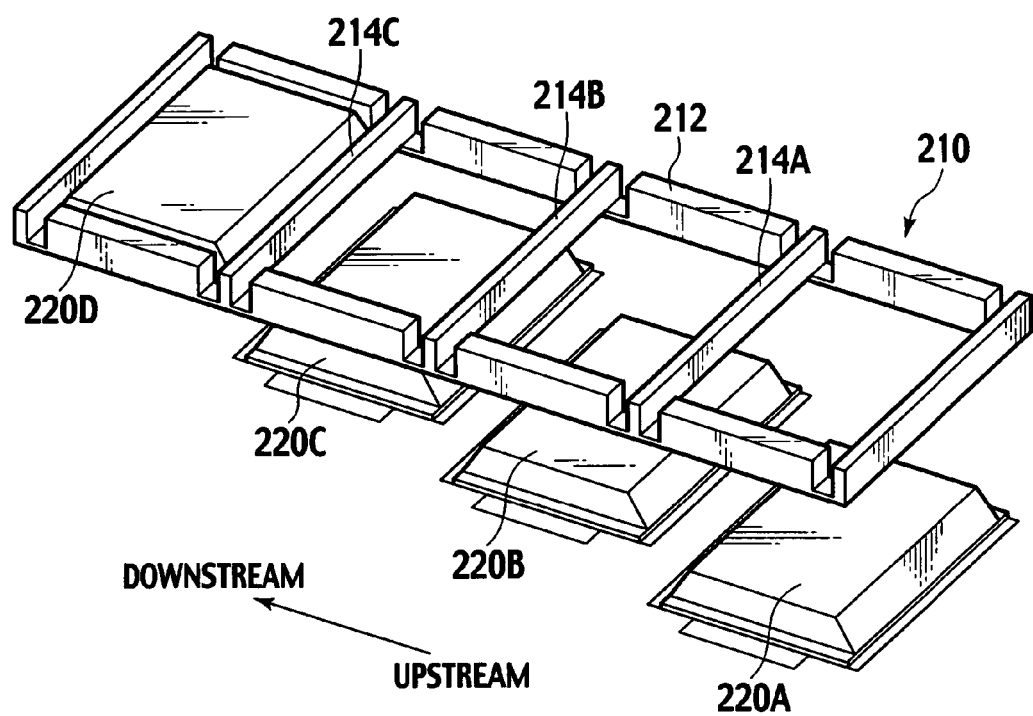
FIG. 13 shows the structure of the frame member in the third embodiment.
Figure 14:
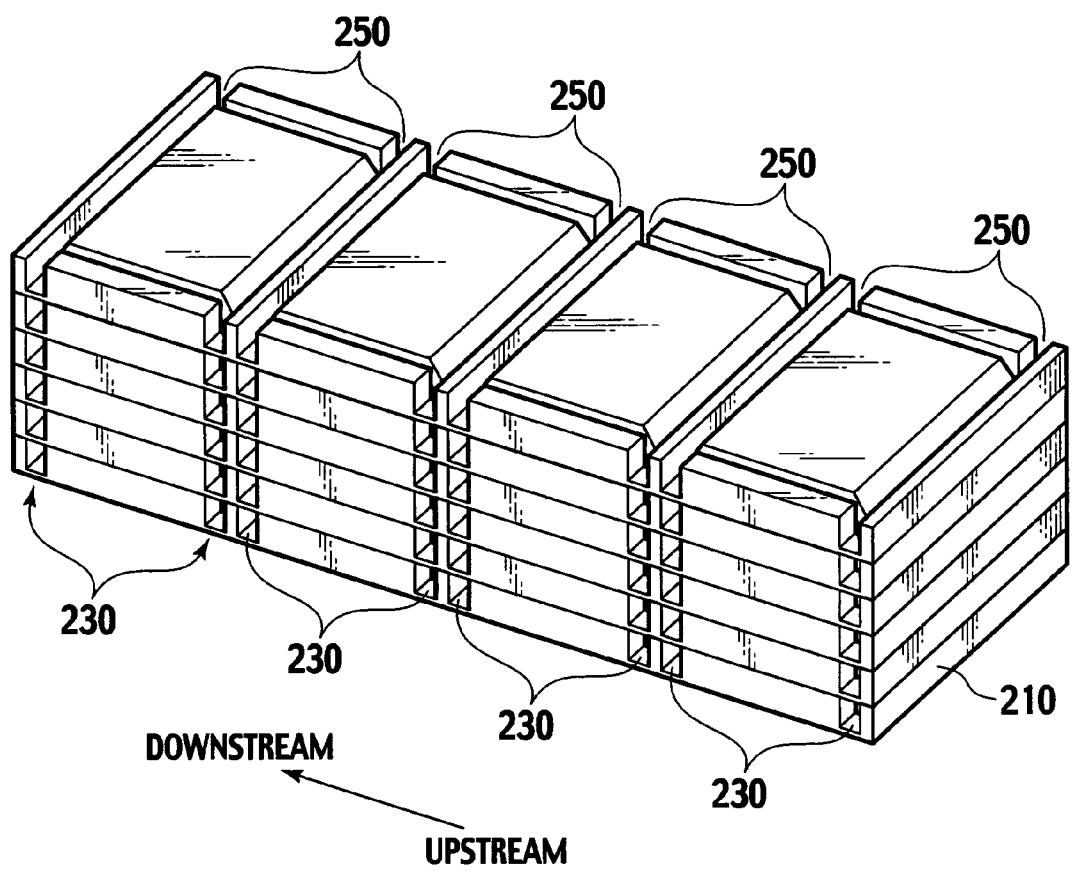
FIG. 14 shows the structure of the frame member in the third embodiment.

The configuration of the frame member related to the third embodiment is described according to FIGS. 12 to 14.

As shown in FIG. 12, the frame member 210, as with the first embodiment, is composed of a rectangular outer frame portion 212 and three cross member portions 214A, 214B, and 214C crossing over to two opposing sides of the outer frame portion 212 in the shape of a ladder. Notches 216A to 216H are formed at the front side of the outer frame portion 212 along the cross member portions 214A, 214B, and 214C. The notches 216I to 216P are formed at opposing positions of the notches 216A to 216H on the back side. As with the first embodiment, the groove 210A is formed in the frame member 210.

Stacking and bringing the frame members 210 into intimate contact with one another causes the notches 216A to 216H to function as coolant inlets and the notches 216I to 216P as coolant outlets. The size of the notches is made constant along the direction of the coolant flow in the same layer.

The unit cells 220A, 220B, 220C and 220D are so arranged that their stool-shaped portions are inserted upward from under the frame member into compartment spaces defined by the outer frame portion 212 and the cross member portions 214A, 214B and 214C of the frame member 210 as shown in FIG. 13.

Six frame members 210, each holding the unit cells 220A, 220B, 220C and 220D in the abovementioned manner, are stacked on one another as illustrated in FIG. 14. This stack arrangement brings the unit cells into direct contact or coherence with each other, and the frame members into direct contact with each other in the stacking direction. A coolant passage from the inlet 230 to outlet 250 is formed by interstices or spaces defined between the frame members 210 and the unit cells 220, the grooves 210A formed in the frame member 210, and the notches 216B to 216D.

The stack so built in the above manner is further stacked while inserting the intermediate heat sinks 310, 320, and 330 therebetween as shown in FIG. 1. The stack is placed between the heat sinks 300 and 340 and fastened with the nuts 400A to 400F to form the battery. The operation of the ventilator fan 850 of the cooling system 500 with the battery 100 is set in will produce the following air flow within the frame members 210 of the battery 100.

In the present embodiment, the battery 100 in the housing of the cooling system 500 is different by 90 degrees in arrangement direction from that in the first and second embodiments. This is because air needs to be circulated widthwise (i.e., in the vertical direction of the figure) in the present embodiment, whereas in the battery 100 in the first and second embodiments air is circulated in the longitudinal direction (in the horizontal direction of the figure) of the battery.

The frame members 210 cohere with one another in the stacking direction, causing air to be introduced only from the inlets 230 shown in FIG. 14. The introduced air flows in parallel through the interstices between the unit cells 220A to 220D and the frame member 210 and the groove 210A of the frame member 210 formed at a place where the frame member touches the peripheral flange portion of the unit cells 220A to 220D to be discharged from the outlet 250. As a result, the unit cells 220A to 220D are directly cooled chiefly by air flowing on the surfaces of the side and the peripheral flange portions thereof.

In the present embodiment the air introduced from the inlet 230 is the same in velocity and that flowing over the unit cells 220A to 220D is also the same in temperature and quantity, allowing all unit cells to be cooled uniformly.

In the present embodiment also, as is the case with the first and second embodiments, the inlet 230 may be increased in cross-sectional area than the outlet 250.

Fourth Embodiment

Figure 15:
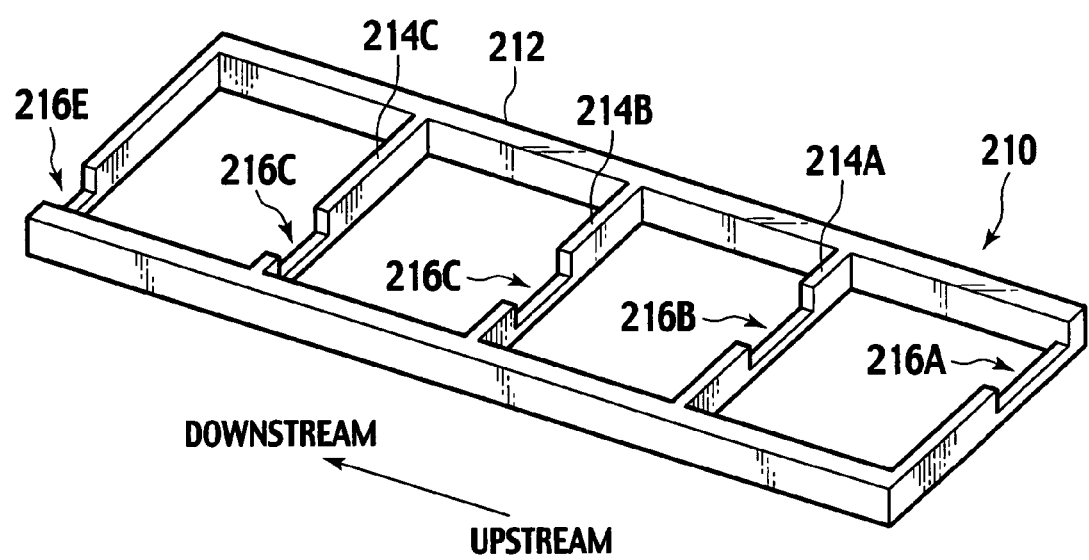
FIG. 15 shows the structure of a frame member in a fourth embodiment of the present invention.
Figure 16:
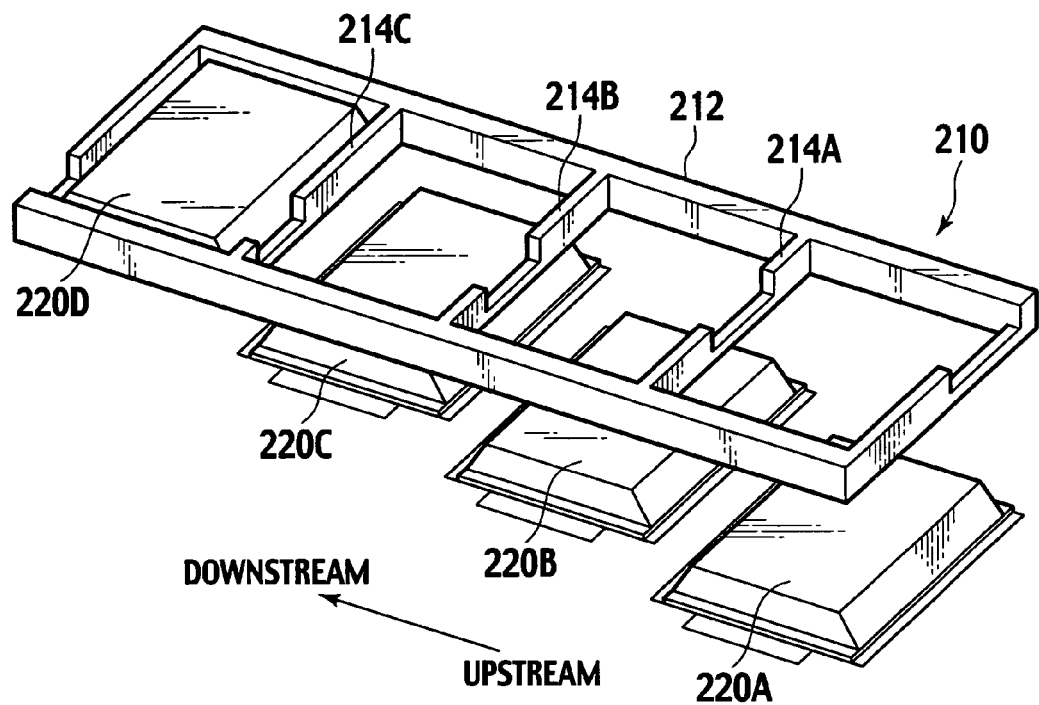
FIG. 16 shows the structure of the frame member in the fourth embodiment.
Figure 17:
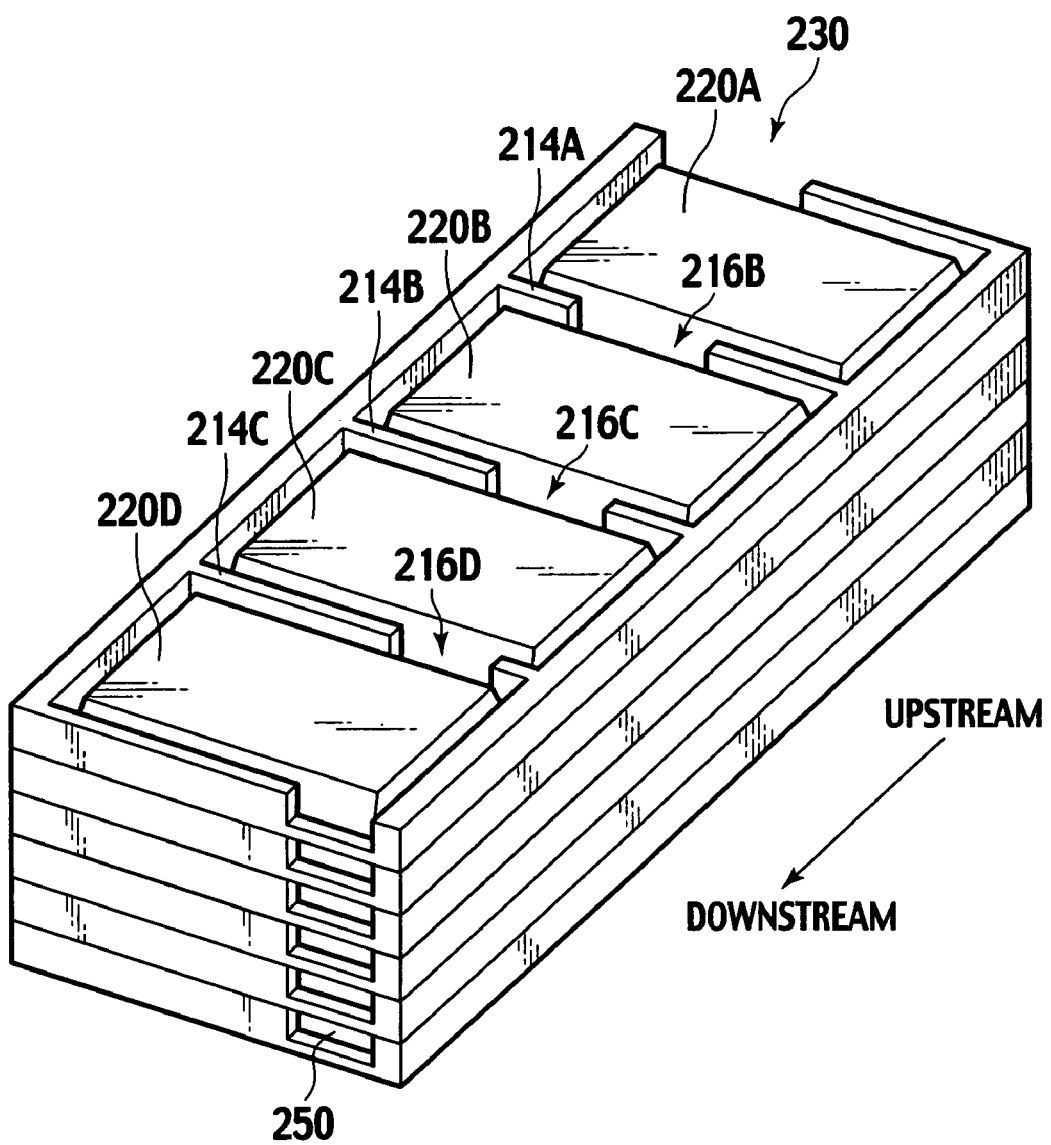
FIG. 17 shows the structure of the frame member in the fourth embodiment.

The configuration of the frame member related to the fourth embodiment is described according to FIGS. 15 to 17.

As shown in FIG. 15, the frame member 210 is composed of a rectangular outer frame portion 212 and three cross member portions 214A, 214B, and 214C crossing over to two opposing sides of the outer frame portion 212 in the shape of a ladder. A U-shaped notch (opening or groove) 216A is formed on one side of the outer frame portion 212, a U-shaped notch 216B on the cross member portion 214A, a U-shaped notch 216C on the cross member portion 214B, a U-shaped notch 216D on the cross member portion 214C, and a U-shaped notch 216E on the other side of the outer frame portion 212.

The notches 216A to 216E in the first embodiment are formed at the center in the longitudinal direction of the frame member 210. In the present embodiment, however, the notches 216A to 216E are displaced from the center in position and placed along the diagonal of the frame member 210. The groove 210A is provided in the frame member 210 as with the first embodiment.

Stacking and bringing the frame members 210 into intimate contact with one another causes the notch 216A to function as a coolant inlet and the notch 216E as a coolant outlet. The notches 216B, 216C and 216D function as a part of a coolant passage.

Both notches 216A and 216E are formed to be different in size from each other so that the cross-sectional area (an opening area) of the notch 216A functioning as the coolant inlet in the coolant flow direction is larger than that of the notch 216E functioning as the coolant outlet in the coolant flow direction.

The notches 216B, 216C and 216D functioning as a part of the coolant passage gradually decrease in cross-sectional area in the coolant flow direction from the upstream to downstream in the coolant flow direction so that the coolant flowing therethrough can be gradually increased in flow velocity from the upstream to downstream in the coolant flow direction.

The unit cells 220A, 220B, 220C and 220D are so arranged that their stool-shaped portions are inserted upward from under the frame member into compartment spaces defined by the outer frame portion 212 and the cross member portions 214A, 214B and 214C of the frame member 210 as shown in FIG. 16.

Six frame members 210, each holding the unit cells 220A, 220B, 220C and 220D in the abovementioned manner, are stacked on one another as illustrated in FIG. 17. This stack arrangement brings the unit cells into direct contact or coherence with each other, and the frame members into direct contact with each other in the stacking direction. A coolant passage from the inlet 230 to outlet 250 is formed by interstices or spaces defined between the frame members 210 and the unit cells 220, the grooves 210A formed in the frame member 210, and the notches 216B to 216D.

The stack so built in the above manner is further stacked while inserting the intermediate heat sinks 310, 320, and 330 therebetween as shown in FIG. 1. The stack is placed between the heat sinks 300 and 340 and fastened with the nuts 400A to 400F to form the battery. The operation of the ventilator fan 850 of the cooling system 500 with the battery 100 is set in will produce the following air flow within the frame members 210 of the battery 100.

Cohesion or close contact of the frame members 210 with one another in the stacking direction permits air to be introduced only from the inlet 230 shown in FIG. 17. The introduced air reaches the notch 216B of the cross member portion 214A through the interstices between the outer surface of the unit cell 220A and the inner surface of the frame member 210, and through the groove 210A of the frame member 210 formed in a position where the frame member comes into contact with the peripheral flange portion of the unit cell 220A. The air introduced from the notch 216B then reaches the notch 216C of the cross member portion 214B through the interstices between the outer surface of the unit cell 220B and the inner surface of the frame member 210, and through the groove 210A of the frame member 210 formed in a position where the frame member comes into contact with the peripheral flange portion of the unit cell 220B. The air introduced from the notch 216C then reaches the notch 216D of the cross member portion 214C through the interstices between the outer surface of the unit cell 220C and the inner surface of the frame member 210, and through the groove 210A of the frame member 210 formed in a position where the frame member comes into contact with the peripheral flange portion of the unit cell 220C. Finally the air introduced from the notch 216D is discharged from the outlet 250 through the interstices between the outer surface of the unit cell 220D and the inner surface of the frame member 210 and the groove 210A of the frame member 210 formed in a position where the member comes into contact with the peripheral flange portion of the unit cell 220C. In this manner the unit cells 220A to 220D are directly cooled by the air flowing on the outer surfaces thereof and the peripheral flange portions thereof.

The notch 216A forming the inlet 230, the notches 216B to 216D forming the coolant passage, and the notch 216E forming the outlet 250 are formed to be gradually reduced in cross-sectional area from the inlet 230 to the outlet 250, while the air velocity gradually increases as air flows from the inlet 230 to the outlet 250.

This permits the air introduced from the inlet 230 to flow along the interstices between the inner surface of the frame member 210 and the periphery of each unit cell 220 and gradually increase in air velocity toward the downstream to be discharged from the outlet 250. In the present embodiment, the air flows obliquely from the inlet 230 toward the outlet 250, touching the four sides on the periphery of each unit cell 220, which further increases the cooling efficiency.

Although the air introduced from the inlet 230 gradually increases in temperature as the air flows downstream, the air gradually increases in flow velocity toward the outlet 250. This makes a cooling efficiency even at the upstream and at the downstream, equally cooling all unit cells 220A to 220D wherever they are.

Evaluation of the Embodiments

FIGS. 18A to 18D show how air circulates in the battery 100. FIGS. 19A and 19B show the relationship between the positions of unit cells composing the battery 100 and cooling air velocity and between the positions of unit cells and temperature increase of unit cells respectively.

Figure 18A:
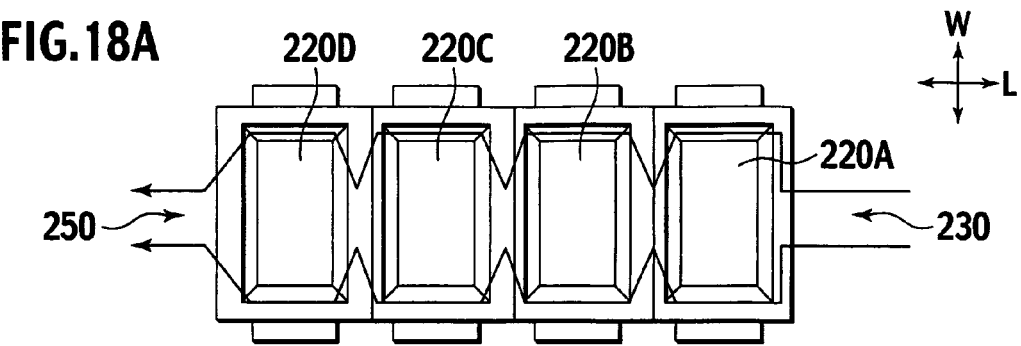
FIG. 18A shows a profile of air flows in the battery.

As illustrated in FIG. 18A the air follows the same route as that in the first embodiment. That is, the air introduced into the room of the unit cell 220A from the inlet 230 splits outward in the width direction W of the battery 100, flows along the periphery of the unit cell 220A, and converges at the center of the width direction W of the battery 100 to then increase in velocity, and flows into the room of the adjacent unit cell 220B. The same is repeated for the unit cells 220B to 220D to discharge the air from the outlet 250.

Figure 18B:
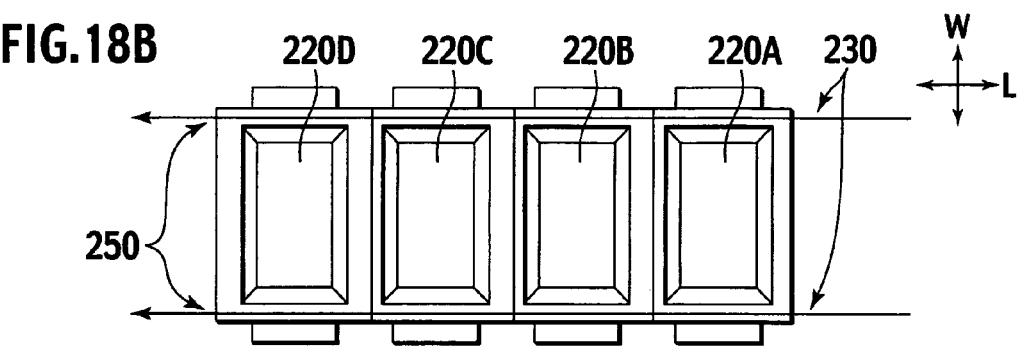
FIG. 18B shows another profile of air flows in the battery.

As illustrated in FIG. 18B the air follows the same route as that in the second embodiment. That is, the air introduced into the room of the unit cell 220A from the inlet 230 flows along two outsides of the battery 100 in the width direction W at the periphery of the unit cell 220A, and increases in velocity when moving from the room of the unit cell 220A to that of the adjacent unit cell 220B. The same is repeated for the unit cells 220B to 220D to discharge the air from the outlet 250.

Figure 18C:
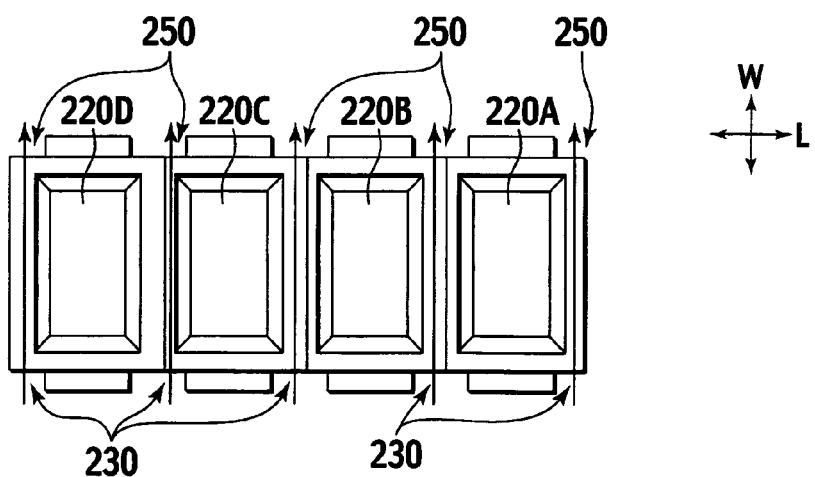
FIG. 18C shows another profile of air flows in the battery.

As illustrated in FIG. 18C the air follows the same route as that in the third embodiment. That is, the air introduced into the rooms of the unit cells 220A to 220D from the inlets 230 arranged in parallel on the outer sides in the width direction W of the battery 100 flows along two sides parallel with the width direction W of the battery 100 at the periphery of the unit cells 220A to 220D, and is discharged from the outlet 250 arranged in parallel on the opposite side in the width direction W of the battery 100.

Figure 18D:
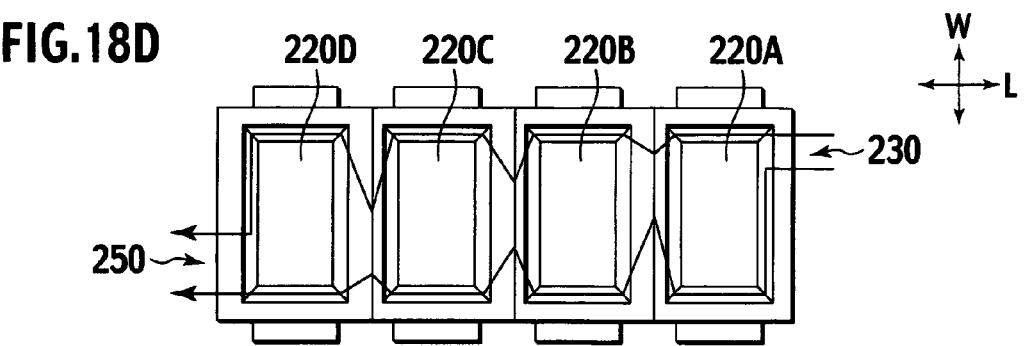
FIG. 18D shows another profile of air flows in the battery.

As illustrated in FIG. 18D the air follows the same route as that in the fourth embodiment. That is, the air introduced into the room of the unit cell 220A from the inlet 230 splits outward in the width direction W of the battery 100, flows along the periphery of the unit cell 220A, and then flows together to increase in air velocity, flowing into the room of the adjacent unit cell 220B. The air will part and meet repeatedly as with the first embodiment. When the air moves from the room of one unit cell to that of an adjacent unit cell, it flows together at a point along the diagonal in each unit-cell layer of the battery 100. Consequently, as compared with the first embodiment is further suppressed the loss in pressure caused when the air introduced into the room of the unit cell 220A from the inlet 230 first splits expansively and when the air finally flows together contractively before discharged from the outlet 250 through the room of the unit cell 220D.

FIG. 19A is graphic presentation of experimental results on the relationship between positions of unit cells and air velocity, obtained when air flows along the routes shown in FIGS. 18A to 18D. FIG. 19B is graphic presentation of experimental results on the relationship between positions of unit cells and temperature increase, obtained when air flows along the routes shown in FIGS. 18A to 18D. A comparative art shown in these figures refer to a battery comprising only heat sinks 300 and 340, and intermediate heat sinks 310, 320, and 330 as cooling means in the battery 100 shown in FIG. 1.

From these graphs, it is shown that, in comparison with the comparative art, air velocities are gradually faster from the inlet 230 to the outlet 250 in all the above routes which the air follows and increase in temperature of the unit cell is also moderated.

The third embodiment shows that dispersion in temperature of the unit cell is the smallest in the graph. The fourth embodiment follows after the third.

In the third embodiment, more coolant inlets in number enable supplying an air capacity equally to each unit cell, but requiring the use of an exhaust fan with large power consumption. On the other hand, in the fourth embodiment, the air velocity is about 2.0 m/s in the vicinity of the sides of the unit cell 220A, and about 12.0 m/s in that of the unit cell 220D when the air capacity of, for example, 1.9 m³/min is given. With an initial cooling air temperature set at 35° C. the temperature on the unit cell 220A is about 38° C., and that on the unit cell 220D is about 42° C. The fourth embodiment gets an advantage over the third in manufacturing a small battery with a moderate power consumption.

In the battery shown as a comparative art, the air capacity flowing on the heat sinks does not change regardless of positions when the air capacity of 1.9 m³/min is given as with the fourth embodiment. With an initial cooling air temperature set at 35° C., the temperature on the unit cell 220A is about 38° C., but the temperature on the unit cell 220D is high as 48° C.

From the above graphs it is shown how greatly the present invention will contribute to improve the disproportion in three-dimensional temperature distribution of the battery 100.

Fifth Embodiment

The configuration of the frame member related to the fifth embodiment is described according to FIGS. 20 to 23.

Figure 20:
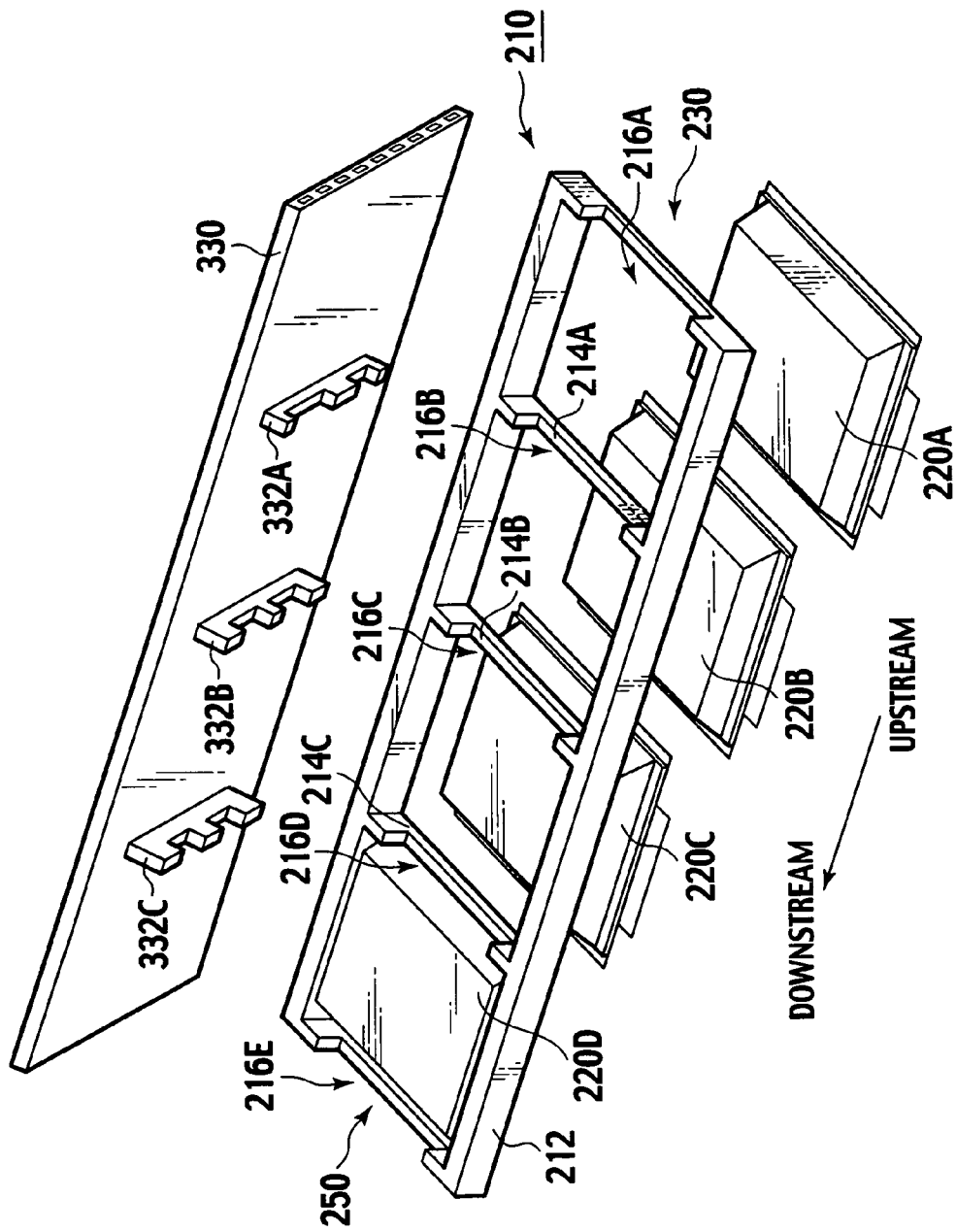
FIG. 20 shows the structure of a frame member and a heat sink in a fifth embodiment of the present invention.

As shown in FIG. 20, the frame member 210 is composed of a rectangular outer frame portion 212 and three cross member portions 214A, 214B, and 214C crossing over to two opposing sides of the outer frame portion 212 in the shape of a ladder. A U-shaped notch (opening or groove) 216A is formed on one side of the outer frame portion 212, a U-shaped notch 216B on the cross member portion 214A, a U-shaped notch 216C on the cross member portion 214B, a U-shaped notch 216D on the cross member portion 214C, and a U-shaped notch 216E on the other side of the outer frame portion 212.

In the present embodiment all notches 216A to 216E are the same in cross-sectional area in the direction of the coolant circulation.

Figure 21:
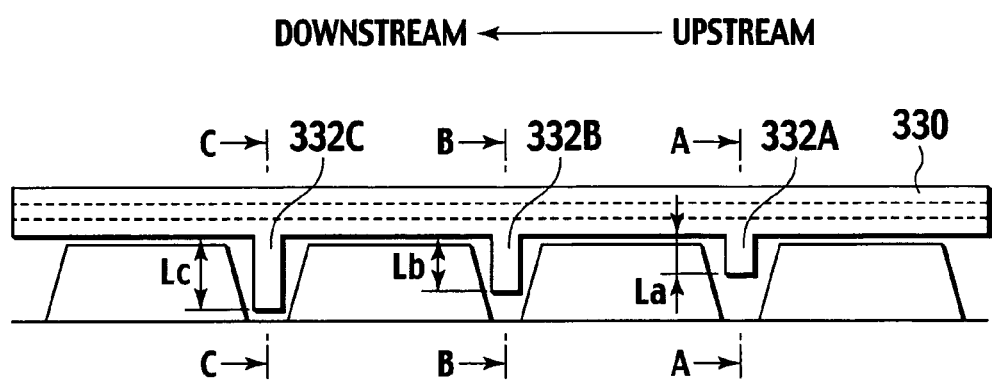
FIG. 21 shows the structure of the frame member and the heat sink in the fifth embodiment.

While, on the intermediate heat sink 330 to be stacked on the frame member 210 are provided projections 332A to 332C at the positions corresponding to the notches 216B to 216D provided on the cross member portions 214A to 216C of the frame member 210. As shown in FIG. 21, the length La of the projection 332A is shorter than the length Lb of the projection 332B. The length Lb of the projection 332B is shorter than the length Lc of the projection 332C. In other words, each projection is gradually increased in length from the upstream to downstream in the direction of air circulation.

Figure 22C:
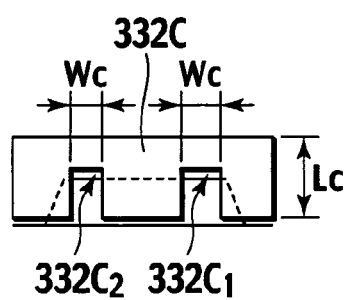
FIG. 22C is a sectional view taken along line C-C in FIG. 21.
Figure 22B:
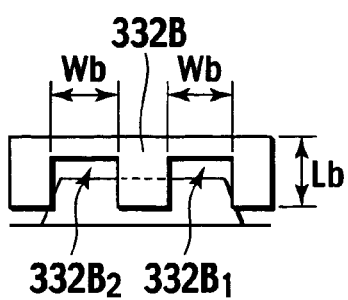
FIG. 22B is a sectional view taken along line B-B in FIG. 21.
Figure 22A:
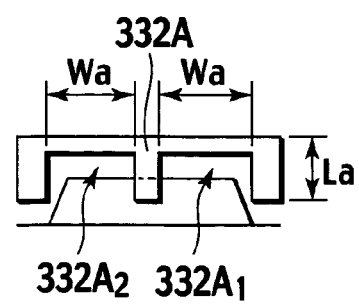
FIG. 22A is a sectional view taken along line A-A in FIG. 21.
Figure 23:
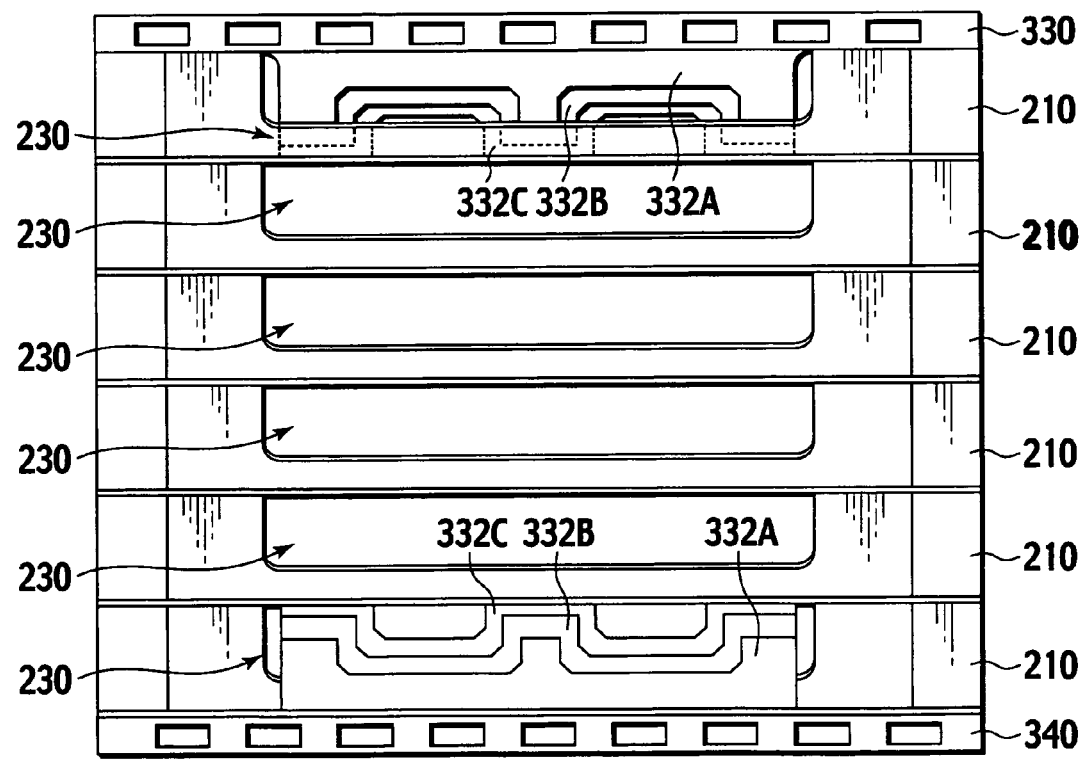
FIG. 23 shows the structure of the frame member and the heat sink in the fifth embodiment.

The projections 332A to 332C have U-shaped notches 332A1 to 332C2 being of a section-channel type as shown in FIGS. 20 and 22A to 22C. As FIGS. 22A to 22C show, the width of the notch 332A1 is equal to the width Wa of the notch 332A2, the width of the notch 332B1 equal to the width Wb of the notch 332B2, and the width of the notch 332C1 equal to the width Wc of the notch 332C2. The width Wa of the notches 332A1 and 332A2 is larger than the width Wb of the notches 332B1 and 332B2, and the width Wb of the notches 332B1 and 332B2 is larger than the width Wc of the notches 332C1 and 332C2. That is, the width of each notch 332 is gradually reduced from the upstream to downstream in the direction of air circulation.

The unit cells 220A, 220B, 220C and 220D are so arranged that their stool-shaped portions are inserted upward from under the frame member into compartment spaces defined by the outer frame portion 212 and the cross member portions 214A, 214B and 214C of the frame member 210 as shown in FIG. 20.

Cohesion of the intermediate heat sink 330 on the frame members 210 allows the notch 216A to function as the inlet 230 and the notch 216E as the outlet 250. That also permits the notches 216B, 216C and 216D, the projections 332A, 332B, and 332C, and the notches 332A1 to 332C2 to function as a coolant passage.

The six frame members 210, each holding the unit cells 220A, 220B, 220C, and 220D therein, are coherently stacked one by one upward from the bottom and sandwiched between the heat sink 340 and the intermediate heat sink 330 from both sides in the stacking direction. Laminating the heat sinks 330 and 340 and the frame members 210 in this manner permits the unit cells 220 situated at both ends in the stacking direction to cohere directly with the heat sinks 330 and 340, the unit cells situated elsewhere to cohere directly with one another, the frame members 210 situated at both ends in the stacking direction to cohere directly with the heat sinks 330 and 340, and the frame members 210 situated elsewhere to cohere directly with one another.

Providing any form of the notches in the first to fourth embodiments to the frame members 210 that do not cohere with the heat sinks 330 and 340 and lie at an intermediate position allows a coolant passage from the inlet 230 to the outlet 250 to be formed between the frame members 210 by interstices between the frame member 210 and the unit cells 220, the groove formed in the frame member 210, and the notches 216B to 216D. Also among the frame members 210 and the heat sinks 330 and 340 from the inlet 230 to the outlet 250 is formed a coolant passage by interstices among the frame member 210, the heat sinks 330 and 340, and unit cells 220, by the notches 216B to 216D formed in the frame members 210, by the projections 332A to 332C formed on the heat sinks 330 and 340, and by the notches 332A1 to 332C2 formed in the projections 332A to 332C.

The stack so built in the above manner is further stacked while inserting the intermediate heat sinks 310, 320, and 330 therebetween as shown in FIG. 1. The stack is placed between the heat sinks 300 and 340 and fastened with the nuts 400A to 400F to form the battery. The operation of the ventilator fan 850 of the cooling system 500 with the battery 100 is set in will produce the following air flow within the frame members 210 of the battery 100.

The air flow between frame members 210 in the present embodiment is the same as the above first to fourth embodiments, description is therefore omitted. In the following is described the air flow between the heat sinks 330 and 340, and the frame members 210.

The cohesion of the heat sinks 330 and 340 to the frame members 210 in the stacking direction causes air to be introduced only from the inlet 230 shown in FIG. 20. The introduced air reaches the notch 216B of the cross member portion 214A through interstices among the unit cell 220A, the frame member 210, and the intermediate heat sink 330. As shown in FIGS. 21, 22A to 22C, in the notch 216B the projection 332A of the heat sink 330 gets in, and notches 332A1 and 332A2 are formed in the projection 332A, which causes the air to circulate via interstices formed by the notch 216B, projection 332A, and notches 332A1 and 332A2. Then the air introduced from the notch 216B reaches the notch 216C through interstices among the unit cell 220B, frame member 210, and intermediate heat sink 330. The air introduced from the notch 216C through the notch 216C, projection 332B, and notches 332B1 and 332B2 reaches the notch 216D of the cross member 214C through interstices among the unit cell 220C, frame member 210 and intermediate heat sink 330. Finally, the air introduced from the notch 216D through interstices formed by the notch 216D, projection 332C, and notches 332C1 and 332C2 is discharged from the outlet 250 through the interstices among the unit cell 220D, frame member 210, and intermediate heat sink 330.

In the present embodiment the areas of interstices formed by the notches 216B to 216D, projections 332A to 332C, and notches 332A1 to 332C2 are formed to be gradually decreased from the upstream to the downstream. Consequently air gradually increases in velocity from the unit cell 220A to the unit cell 220D.

For this reason, the air introduced from the inlet 230 flows along interstices between the inner surfaces of the frame member 210 and the intermediate heat sink 330 and the peripheries of the unit cells 220, converges at the center of each cross member portion 214 to gradually increase in velocity toward the downstream, and is discharged from the outlet 250. The air introduced from the inlet 230 gradually increases its temperature as it flows downstream, but the velocity thereof increases as it flows to the outlet 250, making the cooling capacity almost equal both at the upstream and at the downstream, which results in cooling all unit cells 220A to 220D uniformly.

The present embodiment treats how to form the projection 332 only on the intermediate heat sink 330, but it may be formed on the heat sinks 300 and 340 instead of on the intermediate heat sink 330.

In the above embodiment an air velocity is increased by changing the sizes of the projections 332 and notches formed in the intermediate heat sink 330 without changing those of the notches 216 formed in the cross member portions 214 of the frame member 210. Contrary to that, however, an air velocity may be increased by changing the sizes of the notches 216 formed in the cross member portions 214 of the frame member 210 without changing those of the projections 332 and notches formed in the intermediate heat sink 330.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2004-107131, filed on Mar. 31, 2004, the disclosure of which is expressly incorporated herein by reference in its entirety.

What is claimed is:

1. A battery comprising:
a plurality of stacked unit-cell layers stacked on one another in a stacked direction, including:
    a first unit-cell layer including at least:
        a first unit cell;
        a first frame member which holds the first unit cell therein, wherein the first frame member includes an inlet for introducing a coolant into the inside of the battery and an outlet for discharging the coolant which has passed through the inside of the battery; and
        a space provided between the first unit cell and the first frame member through which the coolant passes; and
    a second unit-cell layer adjacent the first unit-cell layer in the stacked direction including at least a second unit cell and a second frame member which holds the second unit cell therein in the stacked direction relative to the first unit cell, wherein the first and second unit cells are flat unit cells each having a major surface facing in the stacked direction and each comprising a power generating element and an insulating cover covering the power generating element along the respective major surface, and wherein the first unit cell is held in contact at the major surface thereof with the second unit cell in the stacked direction.

2. A battery according to claim 1, wherein
a coolant passage is provided from the inlet to the outlet inside the battery through which the introduced coolant flows and comes into direct contact with at least the first unit cell.

3. A battery according to claim 2, further comprising:
a heat sink provided on at least one of a top of the stacked unit-cell layers and on a bottom of the stacked unit-cell layers.

4. A battery according to claim 1, wherein
the inlet is larger in cross-sectional area than the outlet.

5. A battery according to claim 1, wherein
size of the inlet and/or the outlet varies between the unit-cell layers.

6. A battery according to claim 2, wherein
the coolant passage is adapted to enable a flow of the coolant therethrough to increase its velocity as the coolant flows downstream.

7. A battery according to claim 3, wherein
the first and second frame members comprise an outer frame portion and a plurality of cross member portions extended between the outer frame portion, and
the first and second unit cells are respectively held at a periphery thereof by the outer frame portion and/or the cross member portions.

8. A battery comprising:
unit-cell layers stacked on one another in a stacked direction, the unit-cell layers comprising:
    an array of unit cells;
    a frame member which holds the array of unit cells therein, wherein at least one of frame members is formed to have an inlet for introducing a coolant into the inside of the battery and an outlet for discharging the coolant which has flown through the inside of the battery, wherein spaces are provided between respective unit cells and the frame member through which the coolant passes, wherein the unit cells are flat unit cells each having a respective major surface facing in the stacked direction and respectively comprising a power generating element and an insulating cover covering the power generating element along the respective major surfaces, and wherein the unit cells in adjacent unit-cell layers are held in contact at the major surfaces thereof with each other in the stacked direction; and
    a heat sink provided on at least one of on top of the stacked unit-cell layers, on a bottom of the stacked unit-cell layers, and between the stacked unit-cell layers, wherein a coolant passage is provided from the inlet to the outlet inside the battery, through which the introduced coolant flows and comes into direct contact with at least one of the unit cells, wherein the frame members comprise an outer frame portion and a plurality of cross member portions extended between the outer frame portion, wherein the unit cells are held at periphery thereof by the outer frame portion and/or the cross member portions, and wherein the inlet comprises an opening formed on the outer frame portion of the frame member on one side of the battery, the outlet comprises an opening formed on the outer frame portion of the frame member on the other side of the battery, and the coolant passage includes openings each formed on the cross member portions of the frame member.

9. A battery according to claim 8, wherein the coolant passage includes a groove formed on a top surface or a bottom surface of the frame member where a periphery of the unit cell contacts.

10. A battery according to claim 8, wherein the more downstream the openings of the coolant passage are provided, the smaller in size the openings become.

11. A method for cooling a battery which comprises unit-cell layers stacked on one another in a stacked direction, the unit-cell layers comprising an array of unit cells and a frame member for holding the array of unit cells therein, wherein the unit cells are flat unit cells each having a respective major surface facing in the stacked direction and respectively comprising a power generating element and an insulating cover covering the power generating element along the major surface, and wherein the unit cells in adjacent unit-cell layers are held in contact at respective major surfaces thereof with each other in the stacked direction, the method comprising:
   providing a network of coolant flow paths comprising spaces defined between outer surfaces of the unit cells and inner surfaces of the frame members inside the battery; and
   enabling a coolant to flow through the network of coolant flow paths, wherein the coolant flow increases in velocity due to variations in cross-sectional area of at least one of the coolant flow paths, thereby increasing velocity of coolant flow in the network.

12. A battery according to claim 1, further comprising:
   a network of layered sub-networks of coolant flow paths, the sub-networks being defined between one of the frame member and the unit cells of the respective unit-cell layers.

13. A battery according to claim 1, wherein the second frame member also includes a separate inlet from that of the first frame member for introducing a coolant into the inside of the battery and a separate outlet from that of the second frame member for discharging the coolant which has flown through the inside of the battery.

14. A battery comprising:
   a plurality of stacked unit-cell layers stacked on one another in a stacked direction, including:
      a first unit-cell layer including at least:
         a plurality of first unit cells;
         a first frame member which holds the first unit cells therein, wherein the first frame member includes an inlet for introducing a coolant into the inside of the battery and an outlet for discharging the coolant which has flown through the inside of the battery; and
         a space provided between the first unit cells and the first frame member through which the coolant passes; and
      a second unit-cell layer adjacent the first unit-cell layer in the stacked direction including at least a plurality of second unit cells and a second frame member which holds the second unit cells therein;
   wherein the first and second unit cells are flat unit cells respectively having a major surface facing in the stacked direction and respectively comprising a power generating element and an insulating cover covering the power generating element along the major surface,
   wherein at least one of the first unit cells is held in contact at the major surface thereof with one of the second unit cells in the stacked direction, and
   wherein the first frame member and the second frame member are of a generally rectangular configuration from the perspective of the stacked direction, and wherein the rectangular configuration is bifurcated by at least one cross member substantially parallel to two of the legs of the rectangular configuration and normal to the two other legs of the rectangular configuration and respectively provided between individual cells of the plurality of the first unit cells and the second unit cells parallel to sides of individual unit cells.

15. A battery according to claim 14, wherein the second frame member also includes a separate inlet from that of the first frame member for introducing a coolant into the inside of the battery and a separate outlet from that of the second frame member for discharging the coolant which has passed through the inside of the battery.

16. A battery according to claim 14, further comprising a coolant passage between the inlet and the outlet that is adapted to enable a flow of the coolant therethrough to increase its velocity as the coolant flows from the inlet to the outlet.

17. A battery according to claim 14, wherein cross members include respective notches, wherein the battery includes a coolant passage extending between the inlet and the outlet that also extends through the notches of the cross members, wherein the sizes of the inlet, the notches, and the outlet are progressively smaller in the direction of coolant flow, and wherein the inlet, the notches and the outlet are adapted to enable flow of the coolant therethrough to increase its velocity as the coolant flows from the inlet to the outlet.

18. A battery according to claim 14, wherein the plurality of first unit cells are held in contact, respectively, with the plurality of second unit cells in the stacked direction.

19. A battery according to claim 1, wherein the first unit cell is held in direct abutting contact with the second unit cell in the stacked direction.

20. A battery according to claim 14, wherein the plurality of first unit cells are held in direct abutting contact, respectively, with the plurality of second unit cells in the stacked direction.

* * * * *